United States Patent [19]
Fukuta et al.

[11] Patent Number: 5,615,057
[45] Date of Patent: Mar. 25, 1997

[54] IMAGE RECORD/PLAYBACK APPARATUS INCLUDING A PHOTOGRAPHING DEVICE AND A CONNECTABLE PLAYBACK DEVICE

[75] Inventors: Motoji Fukuta; Masanori Ozawa; Yoshihiko Naruoka; Mineharu Uchiyama, all of Yokohama; Ken Itoh, Yamato, all of Japan

[73] Assignee: Kabushiki Kaisha Toshiba, Kawasaki, Japan

[21] Appl. No.: 632,563

[22] Filed: Apr. 15, 1996

Related U.S. Application Data

[63] Continuation of Ser. No. 233,889, Apr. 26, 1994, abandoned.

[30] Foreign Application Priority Data

| Apr. 27, 1993 | [JP] | Japan | 5-101513 |
| Apr. 27, 1993 | [JP] | Japan | 5-101514 |
| Apr. 27, 1993 | [JP] | Japan | 5-101515 |

[51] Int. Cl.$^6$ .................................................. H04N 5/78
[52] U.S. Cl. ........................... 386/117; 360/15; 358/906; 358/909.1; 386/63
[58] Field of Search ................................ 360/33.1, 15, 13; 358/335, 310, 906, 909; 348/207

[56] References Cited

U.S. PATENT DOCUMENTS 5,065,258  11/1991  Warren et al. ............................ 360/15
5,274,506  12/1993  Hashimoto et al. ................... 360/33.1

FOREIGN PATENT DOCUMENTS 59-107439  6/1984  Japan .
2165496    6/1990  Japan .

*Primary Examiner*—Andrew L. Sniezek
*Attorney, Agent, or Firm*—Cushman Darby & Cushman, IP Group of Pillsbury Madison & Sutro, LLP

[57] ABSTRACT

A camera comprises an optical system, an imaging element, an electric circuit for processing a signal output from the imaging element, a length of magnetic tape and a mechanism for driving the tape. The camera is for photographing objects only. The magnetic tape can be rewind and signals can be reproduced from the tape, only after the camera has been connected to a playback device.

10 Claims, 26 Drawing Sheets

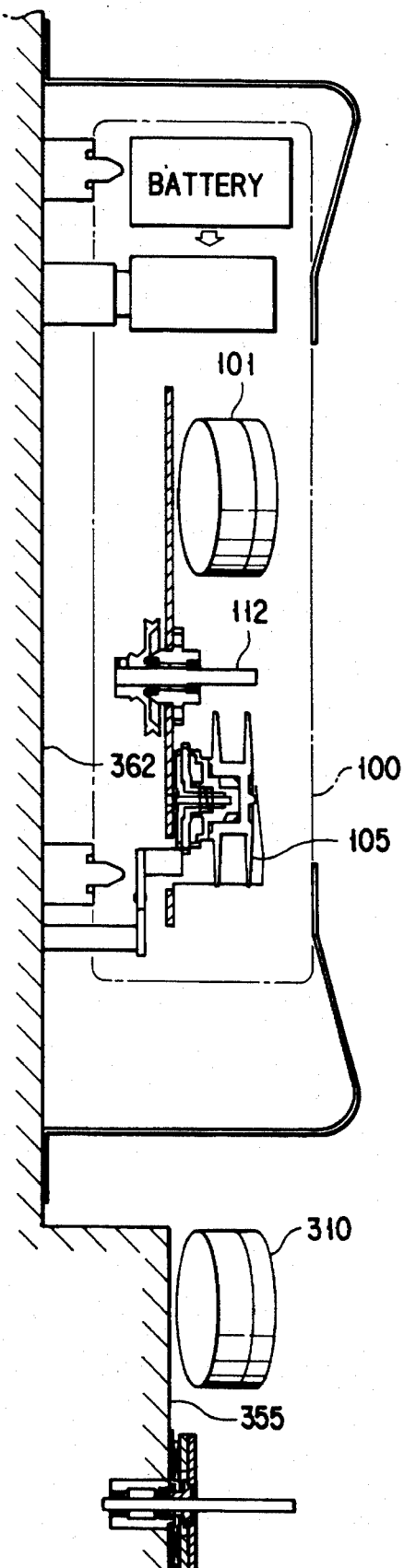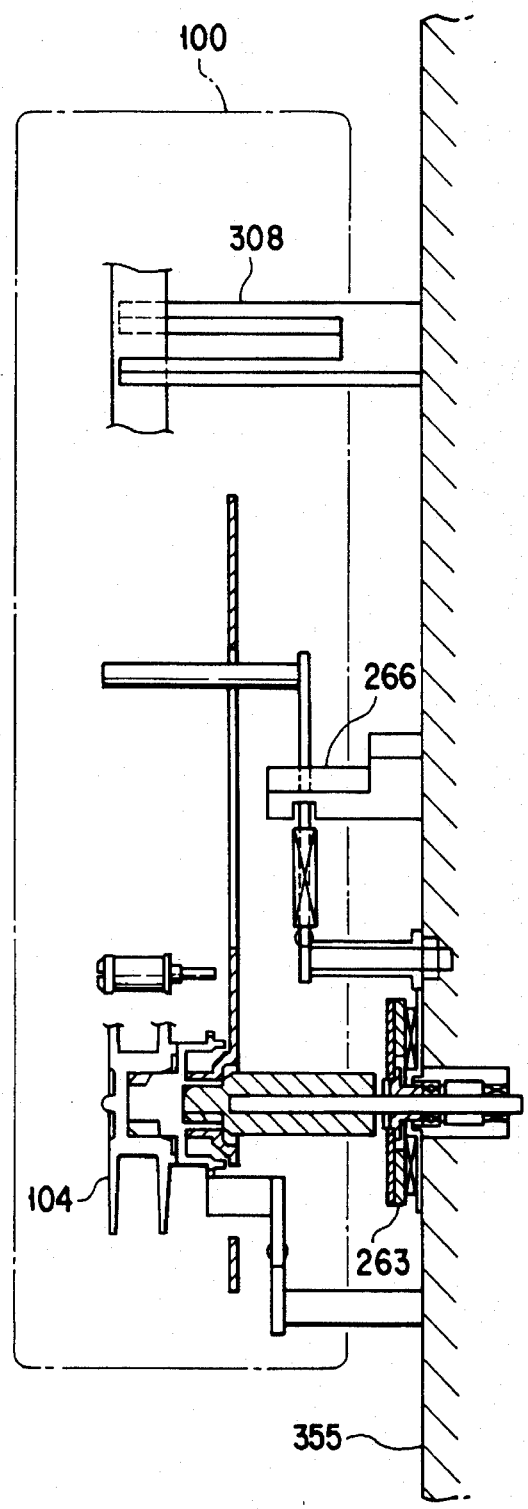
FIG. 21
FIG. 22

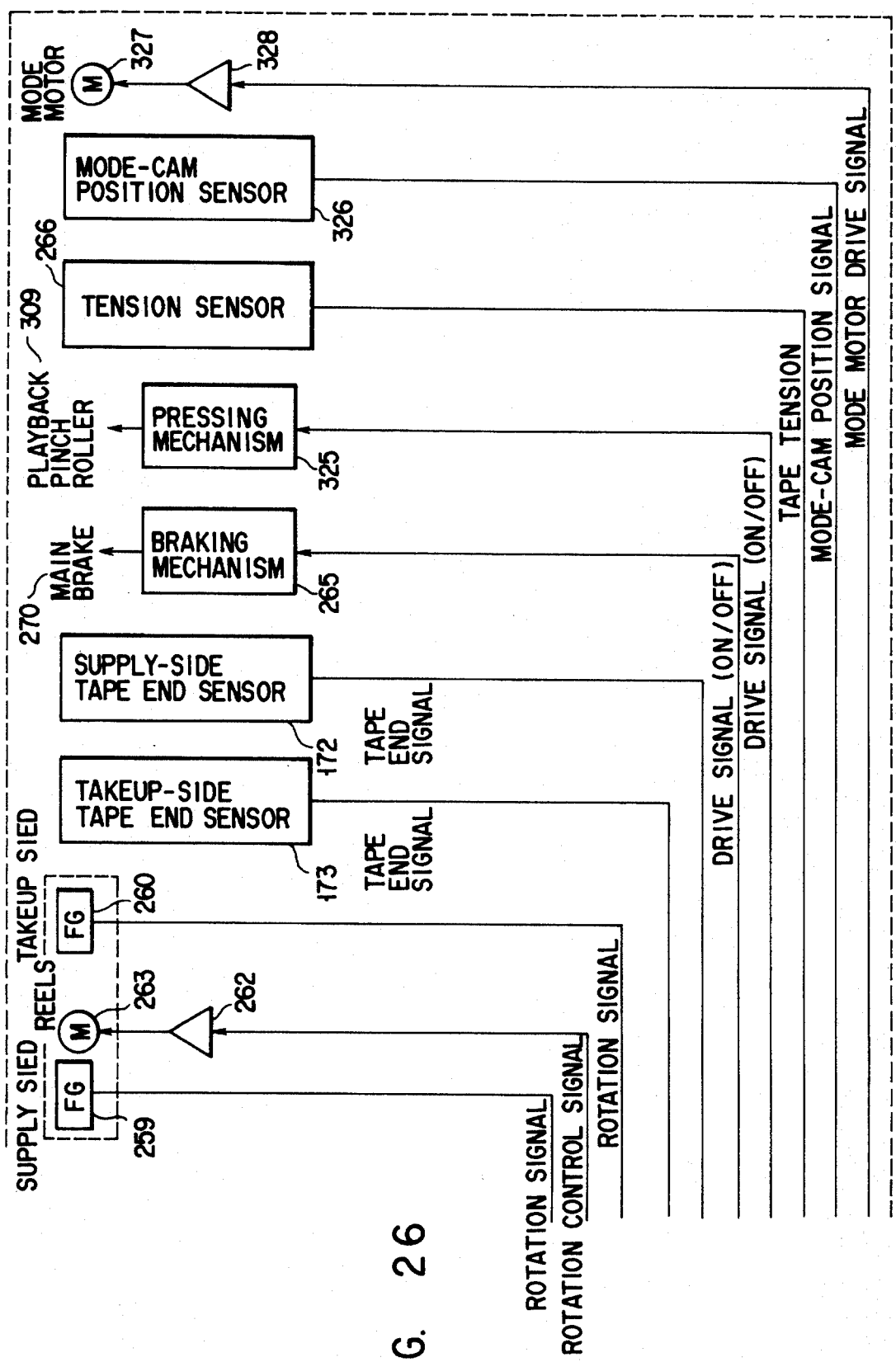
F I G. 26

IMAGE RECORD/PLAYBACK APPARATUS INCLUDING A PHOTOGRAPHING DEVICE AND A CONNECTABLE PLAYBACK DEVICE

This is a continuation of application Ser. No. 08/233,889, filed on Apr. 26, 1994 now abandoned.

BACKGROUND OF THE INVENTION

1. Field of the Invention

The present invention relates to an image record/playback apparatus comprising a motion-picture camera which contains a recording medium and a playback device from which the camera can be removed and which is designed to reproduce images from the recording medium.

2. Description of the Related Art

There are known various systems each comprising a playback device used as an adapter and a video camera electrically connected to the playback device and containing a roll of video tape used as a recording medium. Among these systems is, for example, the 8-mm video tape recorder (VTR) manufactured by Polaroid, Inc.

The video camera of this system incorporates a video-tape driving mechanism, a photographing lens and video-signal processing circuit, and contains a roll of video tape. It has no circuit for reproducing images from the video tape. The playback device of the system has an auxiliary video playback circuit. Thus, in order to reproduce the images from the video tape, the video camera is connected by a connector to the auxiliary video playback circuit built in the playback device. Once the camera is connected to the playback device, power can be supplied to the video-tape driving mechanism, so that the mechanism may drive the video tape.

The operating mode of the video camera can be switched during playback operation in accordance with a mode switching signal supplied from the playback device to the video camera. The operation of the camera is initiated and terminated by operating a button switch provided on the playback device.

To record images on the video tape, the video camera is disconnected from the playback device and then operated. To reproduce the images from the tape, the camera is connected to the playback device and the playback device is operated. The video camera is a very expensive component. Were it be lost, stolen or damaged, the owner of the system would suffer from a great economical loss. In the business of renting video cameras, clerks must comply complex no-life insurance formalities for the system. There has been a great demand for a video camera which is as inexpensive, small and light as is possible.

SUMMARY OF THE INVENTION

Accordingly, a first object of the present invention is to provide an image record/playback apparatus which comprises a camera which is inexpensive, small, light and portable as possible and, therefore, suitable for use in the camera renting business.

A second object of the invention is to provide an image record/playback apparatus comprising a camera which is designed to photograph an image and recording signals representing the image on a recording medium and a playback device to which the camera is removably connected to the playback device and which is designed to reproduce the signals from the recording medium and record them on another recording medium, thus copying the image on the other recording medium.

A third object of this invention is to provide an image record/playback apparatus which comprises a camera which is as inexpensive, small, light and portable as possible and, therefore, suitable for use in the camera renting business, and which further comprises a playback device capable of reliably controlling the mechanism incorporated in the camera.

According to a first aspect of the invention, there is provided an image record/playback apparatus which comprises: a photographing device comprising an optical lens system, an imaging element section for converting an optical signal supplied through the optical lens system, into an electric signal, a record signal processing section for processing the electric signal, a recording medium for recording a signal output from the record signal processing section, and a recording mechanism section for driving the recording medium; and a playback device comprising a connecting section for holding the photographing device, a playback mechanism section to be dynamically connected to at least one of the recording mechanism section and the recording medium, and a reproduced signal processing section for processing a signal reproduced from the recording medium section.

According to a second aspect of the invention, there is provided an image record/playback apparatus which comprises: a photographing device comprising an optical lens system, an imaging element section for converting an optical signal supplied through the optical lens system, into an electric signal, a record signal processing section for processing the electric signal, a recording medium for recording a signal output from the record signal processing section, and a recording mechanism section for driving the recording medium; and a playback device comprising a connecting section for holding the photographing device, a control section for controlling the recording mechanism section during a playback operation, and a reproduced signal processing section for processing a signal reproduced from the recording medium.

According to a third aspect of the invention, there is provided an image record/playback apparatus which comprises: a photographing device comprising an optical lens system, an imaging element section for converting an optical signal supplied through the optical lens system, into an electric signal, a record signal processing section for processing the electric signal, a recording medium for recording a signal output from the record signal processing section, and a recording mechanism section for driving the recording medium; and a playback device comprising a connecting section for holding the photographing device, a reproduced signal processing section for processing a signal reproduced from the recording medium, and sensor means for detecting an operating condition of at least one of said recording medium and said recording mechanism section and generating an electric signal representing the operating condition.

In each record/playback apparatus according to the present invention, the components of the photographing device serve to record signals. To reproduce signals from the recording medium, the photographing device is dynamically connected to the playback device. Since the photographing device has no signal-reproducing component, it comprises a relatively small number of parts and can therefore be made at low cost. The playback device may have a recording device for copying data from the recording medium used in the photographing device. In this case, the photographing device can be rented by itself.

In the apparatus according to the second aspect, the playback device has a control circuit. The control circuit serves to stabilize the operation of the recording mechanism section incorporated in the photographing device.

In the apparatus according to the third aspect, the photographing device has no signal-reproducing component and can, therefore, be made at low cost. The playback device has sensor means which serves to stabilize the operation of the mechanisms incorporated in the photographing device.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 21 is still another diagram also showing the relationship between the camera and playback device of the other apparatus;

FIG. 22 is a diagram illustrating the relationship between the camera and playback device of the other apparatus, too;

FIG. 26 is a block diagram representing the relationship between the electric systems of the camera and playback device of the other apparatus.

DETAILED DESCRIPTION OF THE PREFERRED EMBODIMENTS

Embodiments of the present invention will now be described, with reference to the accompanying drawings.

Structure of the Camera

Figure 1:
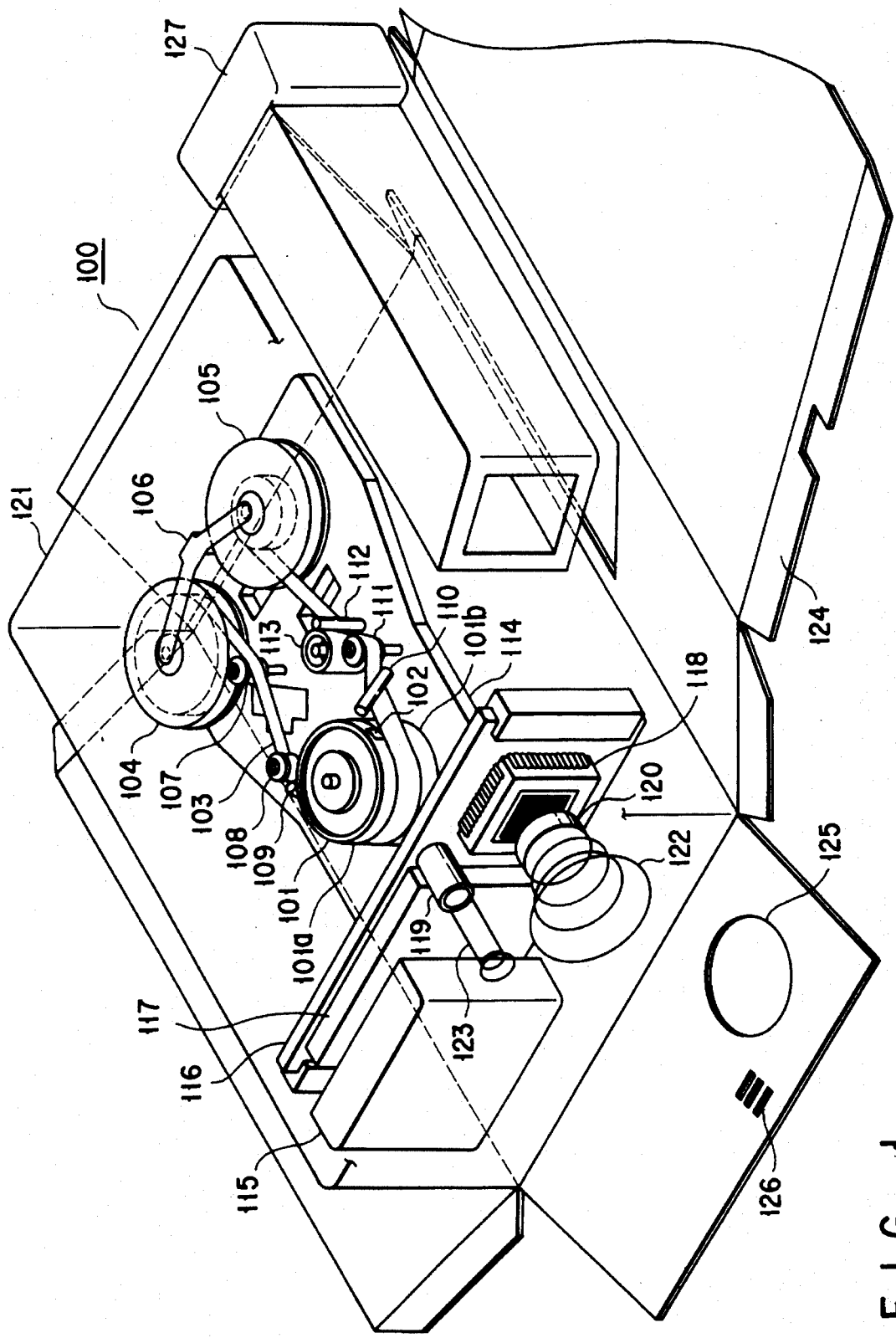
FIG. 1 is a perspective view showing the camera of an image record/playback apparatus according to the present invention.

FIG. 1 shows the camera 100 (i.e., a photographing device) of an image record/playback apparatus according to a first embodiment of the present invention. To be more precise, FIG. 1 is a perspective view of the internal structure of the camera 100, showing the casing 124 of the camera set in unfolded state.

The camera 100 has a single function of recording images; it has been made small and light and at low cost. As shown in FIG. 1, the camera 100 comprises a rotary drum 101 and a magnetic head 102. The drum 101 has an upper cylinder 101a and a lower cylinder 101b. The magnetic head 102 is formed integral with the upper cylinder 101a and can rotate together therewith. The camera 100 further comprises a length of magnetic tape 103, a supply reel 104, and a takeup reel 105. The tape 103 is wound partly around the supply reel 104 and partly around the takeup reel 105.

The camera 100 still further comprises a reel holder 106, a first guide 107, a supply-side roller guide 108, a supply-side helical guide 109, a takeup-side helical guide 110, a takeup-side roller guide 111, a capstan 112, a pinch roller 113, a base plate 114, a battery 115, a circuit board 116, an electric circuit 117, a solid-state imaging element (CCD) 118, a microphone 119, an optical system 120, a housing 121, a lens section 122, a microphone section 123, a casing 124 (made of, for example, paper), a lens window 125, a microphone window 126, and a viewfinder 127.

The circuit board 116 stands on the base plate 114 and vertically extends therefrom. Amounted on the board 116 are the solid-state imaging element 118 and the electric circuit 117 which is an integrated one. The battery 115 is connected to the electric circuit 117. The optical system 120 is located in front of the solid-state imaging element 118 and supported by the housing 121. The supply reel 104 and the takeup reel 105 are arranged on the upper surface of the base plate 114. The magnetic tape 103 is guided from the supply reel 104 by the guides 107 and 108, then given a tension as guided by the helical guide 109, further wrapped around the rotary drum 101, and finally guided to the takeup reel 105 by the guides 110 and 111 and the capstan 112.

The magnetic tape 103 has already been loaded a rotary drum 101 when the camera 100 is completely assembled. It is therefore unnecessary for a user to load the tape 103 into, or unload it, from the camera 100. When the user operates the record start button (not shown) provided on the casing 124, the camera 100 starts recording images on the magnetic tape 103.

Operation of the Camera of Embodiment 1

The operation of the camera 100 will be explained, with reference to FIG. 2 and FIGS. 3A and 3B.

Figure 2:
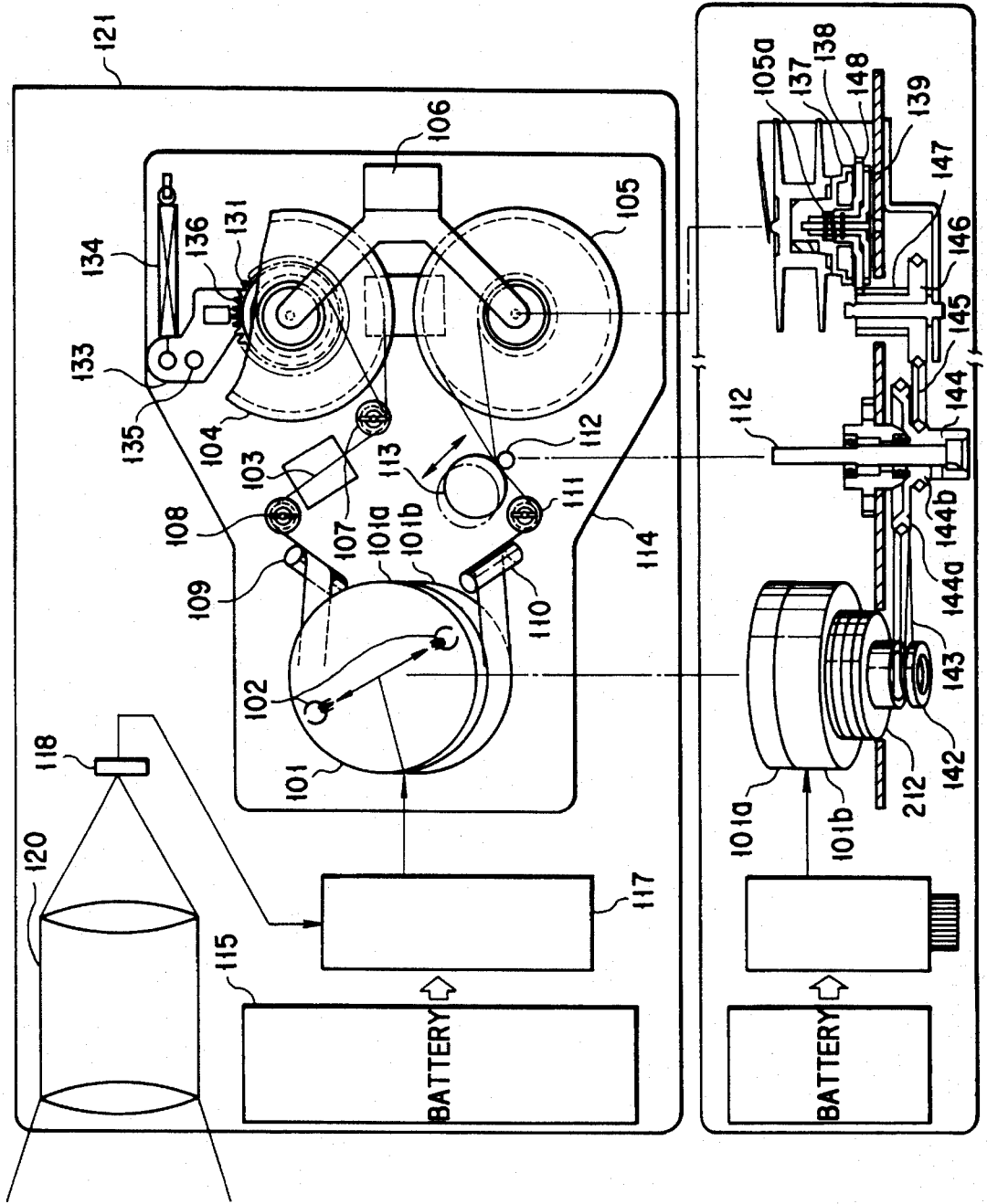
FIG. 2 is a diagram illustrating a part of the camera shown in FIG. 1.
Figure 3A:
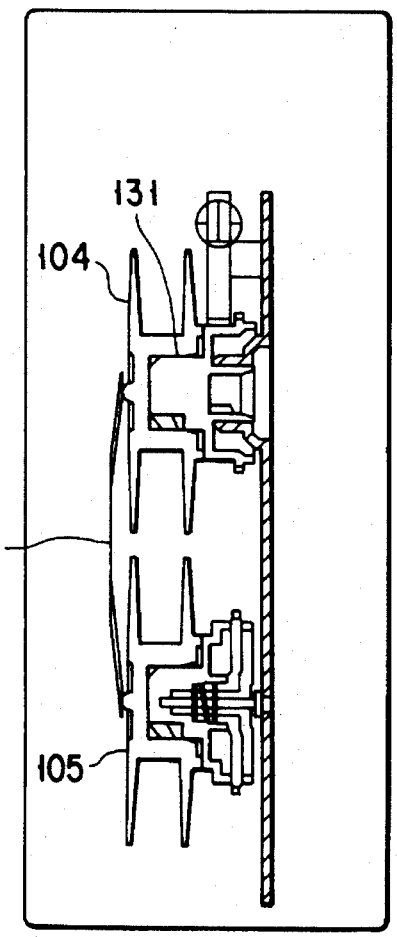
FIGS. 3A and 3B are sectional view showing two sections of the camera.

FIG. 2 consists of a plan view and a front view of the camera 100. FIG. 3A is a side view of the camera 100, whereas FIG. 3B is a sectional view of a device for driving the rotary drum 101.

The optical system 120 focuses an image on the image-receiving surface of the solid-state imaging element 118. The element 118 converts the image into electric signals, which are supplied to the electric circuit 117 mounted on the circuit board 116. The circuit 117 converts the signals into video signals. In the meantime, the microphone 119 catches sound and converts it into electric signals, which are supplied to the electric circuit 117 as well. The circuit 117 amplifies and frequency-modulates the electric signals into audio signals. The video signals and the audio signals are superposed and subsequently supplied via a rotary transformer (not shown) to the magnetic head 102 mounted on the upper cylinder 101a which is rotating. The head 102 records these signals on the magnetic tape 103 in helical scanning mode which is the recording mode of the same type employed in VTR or DAT for home use.

The means for running the magnetic tape 103 will be described. The tape 103 fed from the supply reel 104 is guided to the rotary drum 101 by the guides 107 and 108 and by the helical guide 109 secured and inclined to the base plate 114. The tape 103 is then wrapped around the rotary drum 101 at a prescribed winding angle. The upper cylinder 101a of the drum 101 rotates around its axis inclined to the base plate 114. The magnetic tape 103 is then guided by the helical guide 110 secured and inclined to the plate 114. It is further guided by the guide 111 and passes through the nip between the capstan 112 and the pinch roller 113. The angles at which both helical guides 109 and 110 and the upper cylinder 101a are inclined to the base plate 114 are of such values that the tape 103 may be wound around the reels 104 and 105 positioned at the same height, without being twisted at all.

The means for applying a tension on the magnetic tape 103 throughout the recording operation will be described below.

A supply-side reel table 131 is set in engagement with the supply reel 104. Thus, the supply reel 104 is rotated together with the supply-side reel table 131. A soft brake 133 is supported, capable of freely rotating around a pin 135 vertically stands on the base plate 114. The soft brake 133 has a sliding surface, to which a felt layer 136 is bonded. The felt layer 136 abuts on the outer circumferential surface of the table 131 as the soft brake 133 is rotated clockwise by the force of a soft-brake spring 134. A braking force is thereby exerted on the supply-side reel table 131. As a result, a predetermined tension is applied on that part of the tape 103 which is running from the supply reel 104 to the capstan 112. The tension remains within an allowable range as long as the diameter of the tape roll on the supply reel 104 is greater than the minimum value or less than the maximum value. Therefore, the camera 100 has no tension regulator for regulating the tension on the tape 103.

The means for driving a takeup-side reel table 137 during photographing operation will be described, with reference to FIG. 3B.

Figure 3B:
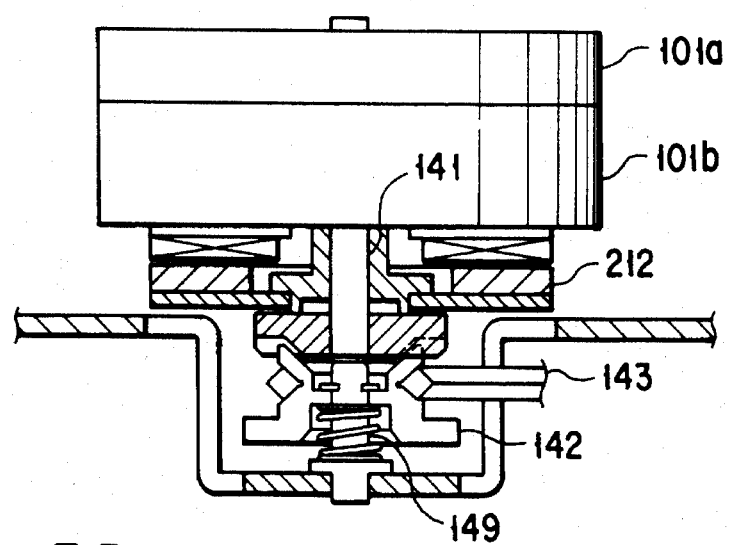

As shown in FIG. 3B, a cylinder motor 212 is located below the lower cylinder 101b and in coaxial alignment with the upper cylinder 101a, for rotating the upper cylinder 101a. A cylinder pulley 142 is mounted on the lower end portion of the shaft 141 of the cylinder motor 212. The pulley 142 is set in engagement with the shaft 142 by the force of a cylinder pulley spring 149. Thus, when the cylinder motor 212 rotates, the pulley 142 is rotated. As shown in FIG. 2, a capstan pulley 144 is mounted on the capstan 112. The capstan pulley 144 has a large pulley 144a and a small pulley 114b. An endless belt 143 is wrapped around the cylinder pulley 142 and the large pulley 144a, for rotating the capstan 112. An endless belt 145 is wrapped around the small pulley 144b and a reel pulley 146, for transmitting the rotating of the capstan pulley 144 to the reel pulley 146. An intermediate gear 147 is secured to the reel pulley 146 and aligned coaxial therewith. The gear 147 is in mesh with a takeup-side reel gear 138. Hence, when the intermediate gear 147 rotates, the takeup-side reel gear 138 is rotated. A clutch 148 transmits the rotation of another takeup-side reel gear 139. A spring 105a exerts a force on the gear 138, pressing the gear 138 onto the gear 139. A difference in rotational speed between the gears 138 and 139 is canceled, whereby a torque is transmitted from the gear 128 to the gear 139.

Figure 4:
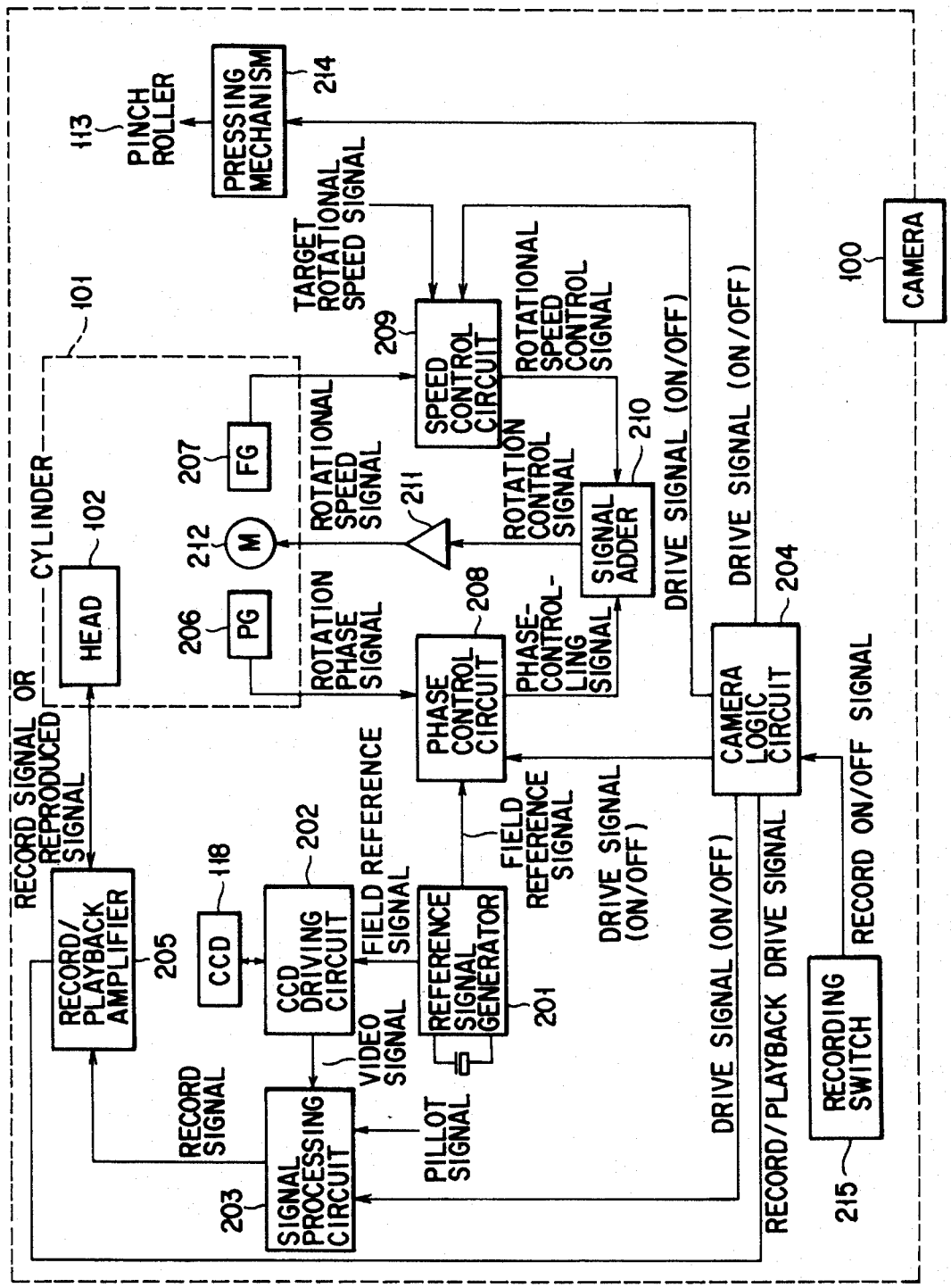
FIG. 4 is a block diagram showing the electric system of the camera.

FIG. 4 is a block diagram showing the electric system of the camera 100. With reference to FIG. 4, it will be explained how the electric system operates when the camera 100 is set in photographing mode. First, a record switch 215 outputs a record on/off signal as a user operates a record switch (not shown). The record on/off signal remains at on-level while a user keeps pressing the record switch 215, and at off-level while the switch 215 remains not pressed. As long as the record on/off signal stays at the off-level, the drive signal supplied to a signal processing circuit 203 and a pressing mechanism 214 stays at the off-level. The pressing mechanism 214 is used to press the pinch roller 113 onto the capstan 112, thereby to make the capstan 112 run the magnetic tape 103. When the record switch 215 is turned on, setting the record ON/OFF signal at the on-level, the drive signal supplied to the signal processing circuit 203 and the pressing mechanism 214 is set at the on-level, and record signals are supplied to a record/playback amplifier 205. Whether the signal generated by the record switch 215 is at the on-level or the off-level, a drive signal supplied to a phase control circuit 208 and a speed control circuit 209 remains at the on-level, while the record signal or the reproduced signal supplied to the record/playback amplifier 205 stays at record level.

A field reference signal output from a reference signal generator 201 is input to a CCD driving circuit 202. In accordance with the reference signal, the circuit 202 drives the solid-state imaging element 118. The element 118 starts photographing an image and generates a video signal, which is supplied to the signal processing circuit 203. The signal processing circuit 203 superposes a drive signal output from a camera logic circuit 204, a video signal output from the element 118, and a pilot signal, one upon another, thereby generating a record signal which remains at the on-level while the drive signal is staying at the on-level. When the drive signal is at the off-level, the output of the signal processing circuit 203 remains at high impedance. The record/playback amplifier 205 amplifies the record signal from the logic circuit 204 in accordance with the record/playback signal supplied from the signal processing circuit 203. The record signal, thus amplified, is supplied to the magnetic head 102.

The circuit 205 amplifies a reproduced signal from the head 102 when the camera 100 is set in playback mode.

The rotary drum 101 contains a rotational phase detector 206. The detector 206 outputs a rotational phase signal which represents the rotational phase of the upper cylinder 101a. The rotational phase signal is supplied to the phase control circuit 208. The drum 101 further contains a rotational speed detector 207. This detector 207 outputs a rotational speed signal which has a magnitude proportional to the rotational speed of the drum 101. The rotational speed signal is supplied to the speed control circuit 209.

The phase control circuit 208 receives the drive signal from the camera logic circuit 204, the field reference signal from the reference signal generator 201 and the rotational phase signal from the rotational phase detector 206. When the drive signal supplied to the circuit 208 is at the on-level, the phase control circuit 208 outputs a phase control signal which will be used to control the rotational phase of the upper cylinder 101a so that the field reference signal and the rotational phase signal may be synchronous with each other. On the other hand, when the drive signal is at the off-level, the output of the phase control circuit 208 is set at high impedance.

The rotational speed control circuit 209 receives the rotational speed signal from the rotational speed detector 207 and a target rotational speed signal. When the drive signal supplied to the circuit 209 is at the on-level, the circuit 209 outputs a rotational speed control signal which controls the rotational speed of the upper cylinder 101a so that the rotational speed of the cylinder 101a may become equal to the speed represented by the target rotational speed signal. When the drive signal is at the off-level, the output of the circuit 209 is set at high impedance.

The rotational phase control signal and the rotational speed control signal are input to a signal adder 210. The adder 210 adds these input signals, generating a rotation control signal. The rotation control signal, thus produced, is amplified by an amplifier 211 to the cylinder motor 212. The pressing mechanism 214 receives a drive signal from the camera logic circuit 204. When this drive signal is at the on-level, the mechanism 214 is driven, pressing the pinch roller onto the capstan 112.

In the meantime, the solid-state imaging element 118 outputs a field video signal which is synchronous with the field reference signal generated by the reference signal generator 201. The upper cylinder 101a of the rotary drum 101 is rotated at the target speed, in synchronization with the field reference signal supplied from the reference signal generator 201.

When the signal generated by the record switch 215 is at the off-level, the camera logic circuit 204 sets the drive signals to the signal processing circuit 203 and the pressing mechanism 214 at the off-level, sets the drive signals to the phase control circuit 208 and the speed control circuit 209 at the on-level, and sets the record/playback signal to the record/playback amplifier 205 at the record level. Since the drive signal supplied to the signal processing circuit 203 is at the off-level, the circuit 203 generates no record signal which is to be supplied to the magnetic head 102 via the record/playback amplifier 205. Since the drive signal supplied to the pressing mechanism 214 is at the off-level, the pinch roller 113 is not pressed onto the capstan 112. Thus, the capstan 112 and the pinch roller 113 do not cooperate to run the magnetic tape 103.

When the record on/off signal is at the on-level, the camera logic circuit 204 sets the drive signals to the signal processing circuit 203, the pressing mechanism 214, the phase control circuit 208 and the speed control circuit 209 at the on-level. As a result, the signal processing circuit 203 superposes the video signal and the pilot signal, thereby producing a record signal, which is supplied to the record/playback amplifier 205. The record/playback amplifier 205 amplifies the record signal and supplies it to the magnetic head 102. The pressing mechanism 214 presses the pinch roller 113 onto the capstan 112, whereby the tape 103 is fed toward the takeup reel 105. The magnetic head 102 records the signal from the amplifier 205, i.e., the video signal which has been generated by the solid-state imaging element 118.

To reproduce the video signal from the magnetic tape 103, the camera 100, i.e., a major component of the image record/playback apparatus, is connected to the playback device which is another major component by electrical connecting means, mechanical and dynamical connecting means.

The camera 100 can be regarded as a cassette half, rather than a video camera, which contains an optical system, an imaging element, an electric circuit, one-direction tape driving means, and tape recording means. The cassette half has a viewfinder, and more than half of it is covered with the casing 124 (made of flexible material such as paper), with the lens window 125 and the viewfinder window not closed by the casing 124.

As shown in FIG. 2, the camera 100 has a battery 115. To save the power of the battery 115, a mechanical power source such as a coil spring may be used to rotate the drum 101 and to run the tape 103. The camera 100 can be operated in standby mode and full-power mode, also for the purpose of saving power. To use the camera 100 as a rental one, it should better be made at as low a cost as possible. The signal output from the solid-state imaging element 118 can be amplified, synchronized and recorded on the tape 103, without being converted into a video signal, since it can be reproduced by the playback device which is specially designed for use in combination with the camera 100.

Playback Device of Embodiment 1

Figure 5:
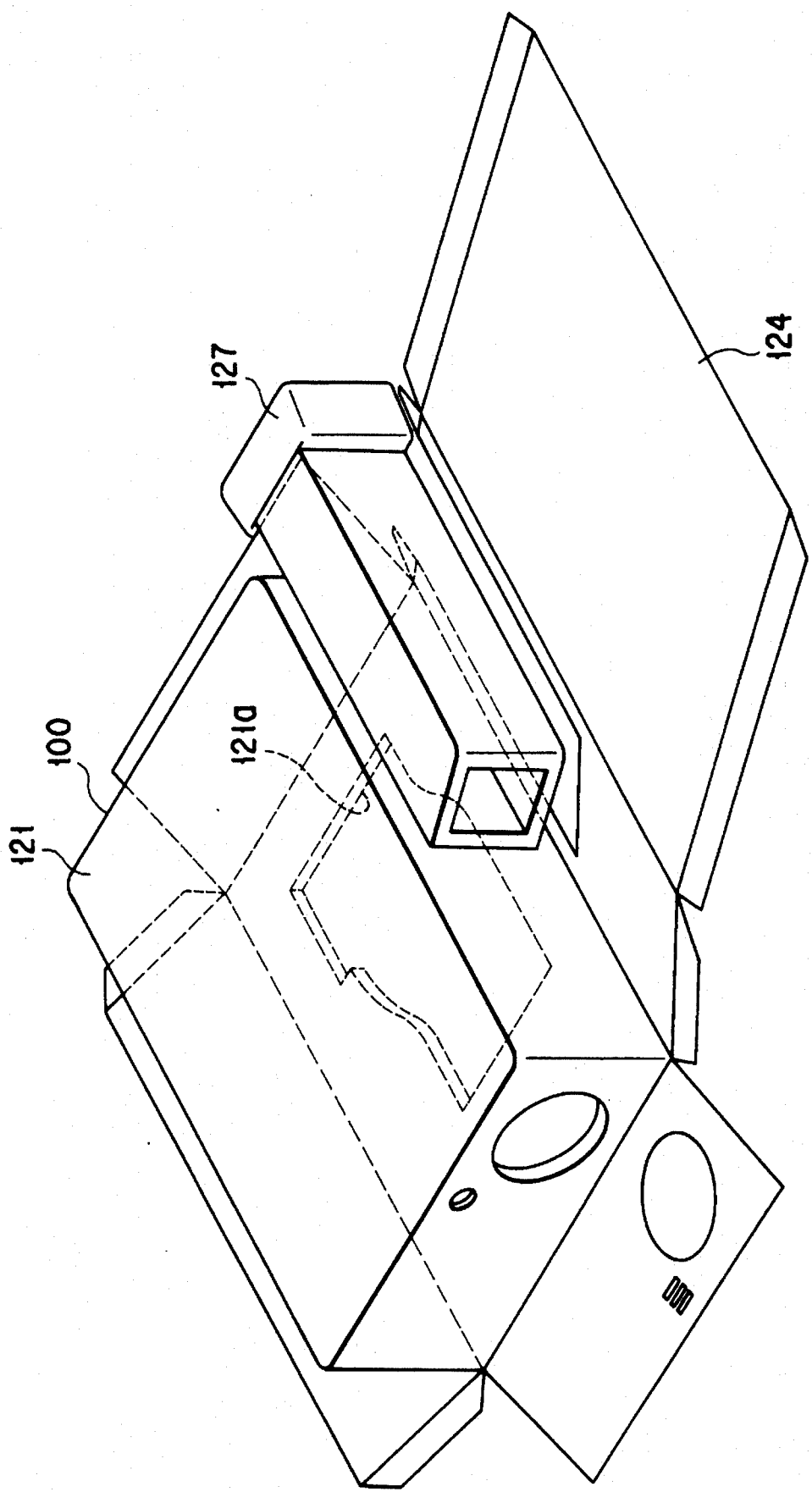
FIG. 5 is a perspective view of the casing of the camera.

In order to reproduce the video signal from the magnetic tape 103, the casing 124 made of waterproof paper or dampproof paper is removed from the camera 100 as shown in FIG. 5, thus exposing the housing 121 of the camera 100. The housing 121 has an opening 121a which is closed by the casing 124 as long as the camera 100 is used to photograph an object.

Figure 6:
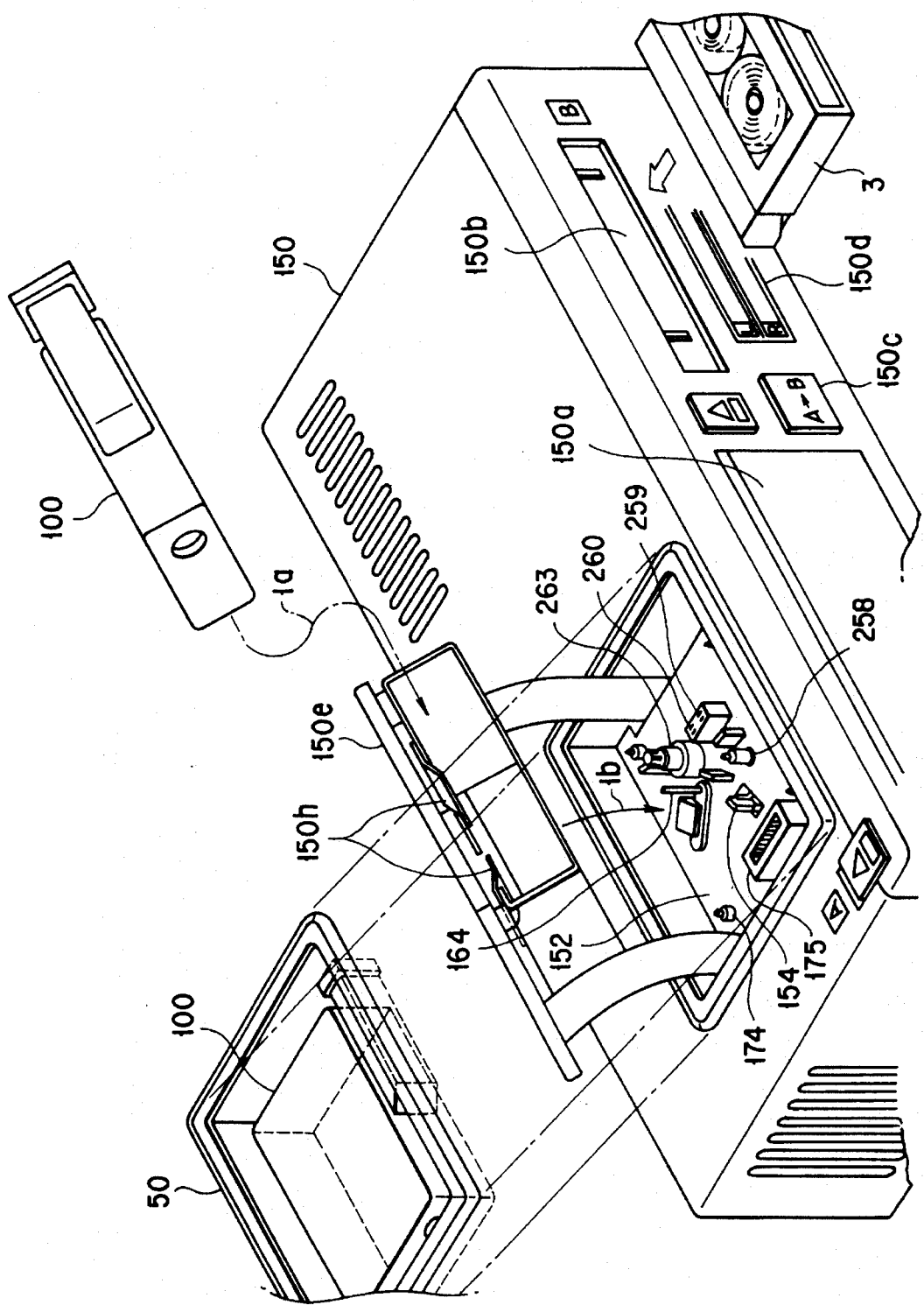
FIG. 6 is a perspective view showing the condition in which the camera and playback device of the image record/playback apparatus.

FIG. 6 shows the playback device 150. The playback device 150 comprises a section for holding the camera 100 and a magnetic record/playback unit (not shown) for recording video signals reproduced from the recorded tape in the camera 100, on a roll of tape contained in a cassette 3. The device 150 has a display 150a, a slot 150b, a push button 150c and a volume meter 150d—all provided on the front of the housing. The display 150a displays the operating condition of the camera 100. Through the slot 150b the insert the cassette 3 can be inserted into and removed from the device 150. The playback device 150 further has a bucket 150e which is usually placed in a recess formed in the top of the housing.

To attach the camera 100 to the playback device 150, the bucket 150e is pulled upward from the top of the housing to the position illustrated in FIG. 5. The camera 100 is then inserted into the bucket 150e in the direction of an arrow 1a. Next, the bucket 150e is pushed down into the recess in the direction of an arrow 1b. Once the bucket 150e is set in the recess, the springs 150h arranged on the inner surface of the top of the bucket 150e push the camera 110 onto the main base 152 of the playback device 150. As can be seen from FIG. 6, positioning bosses 174, a connector 175, a pulley release arm 154, a capstan motor 258, a reel motor 263, a tension guide 164, a takeup reel sensor 259, and a supply reel sensor 260 are arranged on the main base 152.

The structure and operation of the playback device 150 will be described in greater detail.

Figure 7:
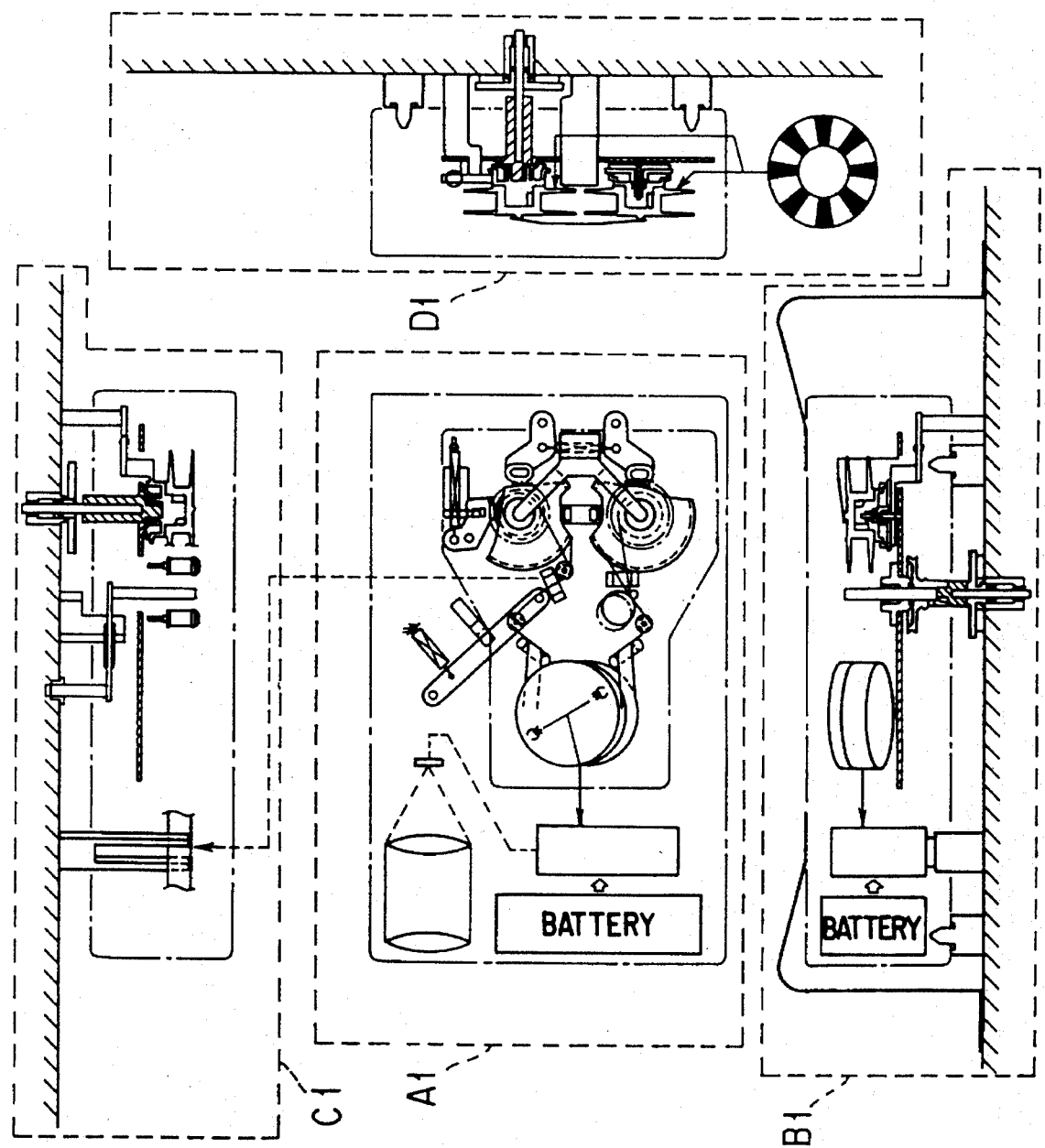
FIG. 7 is a diagram representing the relationship between the camera and the playback device.

FIG. 7 includes a plan view, a front view, a back view and a side view, representing the relationship between the camera 100 and the playback device 150. Blocks A1, B1, C1 and D1 shown in FIG. 7 are more specifically illustrated in FIGS. 8, 9, 10, and 11, respectively.

As indicated above, the camera 100 is set in the playback device 150 after the casing 124 has been removed. At this time, the positioning bosses 174 fit into the positioning holes (not shown) made in the housing 121 of the camera 100. The camera 100 is thereby positioned correctly with respect to the playback device 150. Simultaneously, the camera 100 is electrically connected to the playback device 150.

Figure 9:
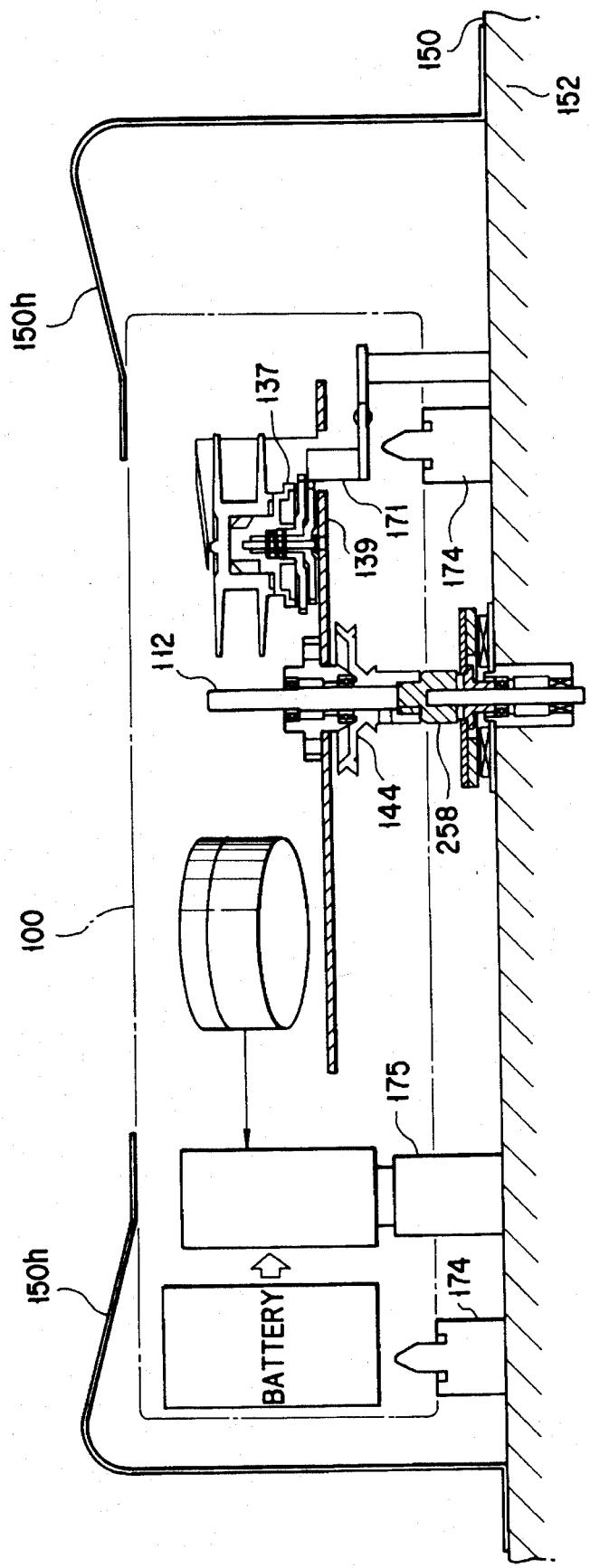
FIG. 9 is still another diagram also showing the relationship between the camera and the playback device.

Once the camera 100 has been attached to the playback device 150, the capstan motor 258 enters the camera 100 through the opening 121a made in the housing 121 and is set in engagement with the capstan pulley 144 to drive the capstan 112. More precisely, the shaft of the motor 258 is connected to the lower end of the capstan pulley 144 as shown in FIG. 9. At this time, as shown in FIG. 12, the cylinder pulley 142 is released from the cylinder motor 212 by a pulley release mechanism 151.

Figure 12:
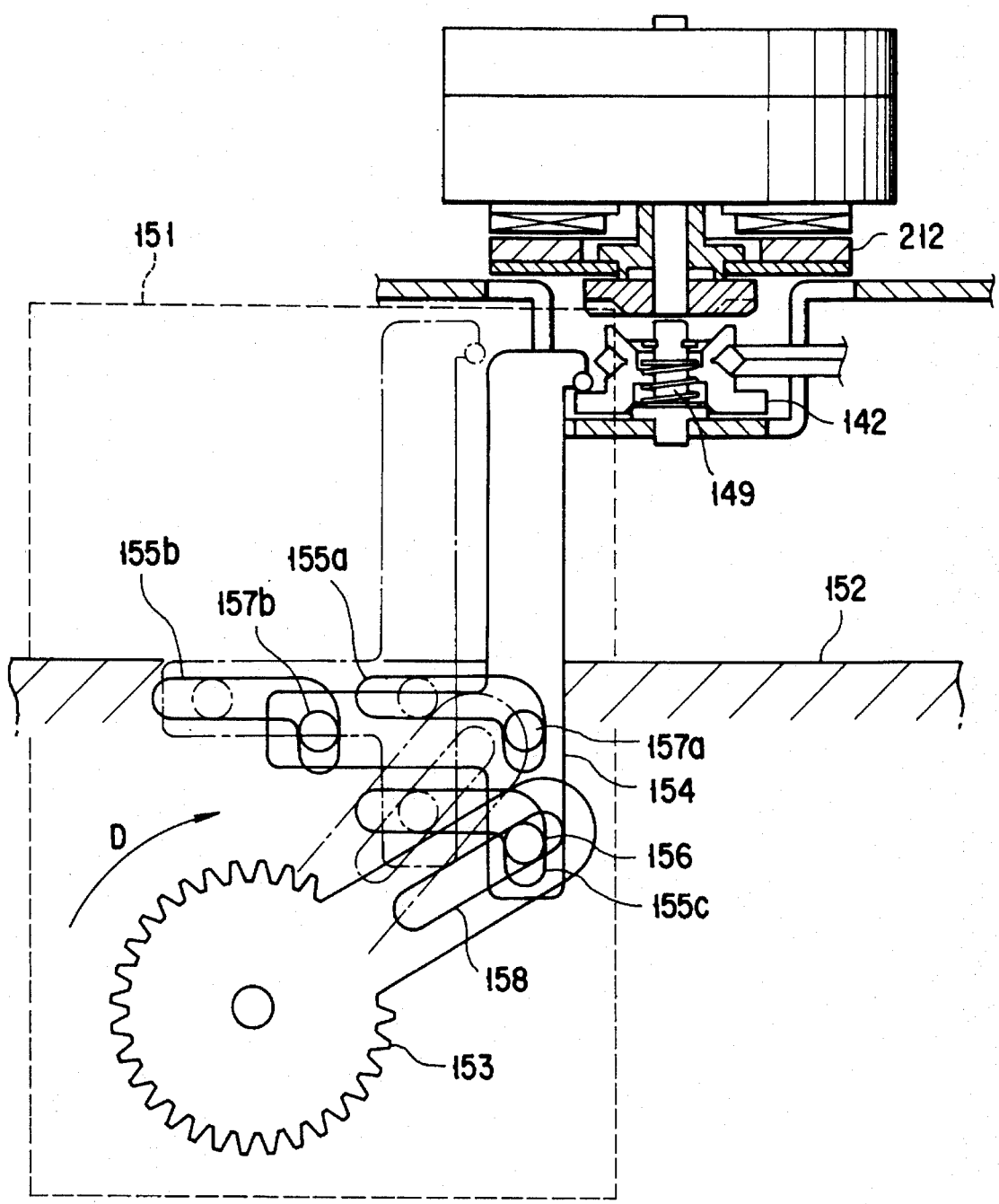
FIG. 12 is another diagram illustrating the relationship between the camera and the playback device.

The cylinder release mechanism 151 has the structure shown in FIG. 12. A cam gear 153 is located below the main base 152 of the playback device 150. The cam gear 153 is to be driven by a drive mechanism (not shown). The cam gear 153 has a lever which has a cam groove or a slit 158, in which an arm pin 156 fixed to a cylinder pulley release arm 154 can slide freely. Also fixed to the cylinder release arm 154 are guide pins 157a and 157b. The guide pins 157a and 157b are slidably set in guide grooves 155a and 155b which are formed in the main base 152. The arm pin 156 is slidably set in a guide groove 155c made in the main base 152. When the cam gear 153 is rotated in the direction of an arrow D, the cylinder pulley release arm 154 moves to the position indicated by solid lines, releasing the cylinder pulley 142 from the cylinder motor 212 against the cylinder pulley spring 149. As a result, the capstan pulley 144 is disconnected from the cylinder motor 212 and can now be rotated by the capstan motor 258 only.

Figure 11:
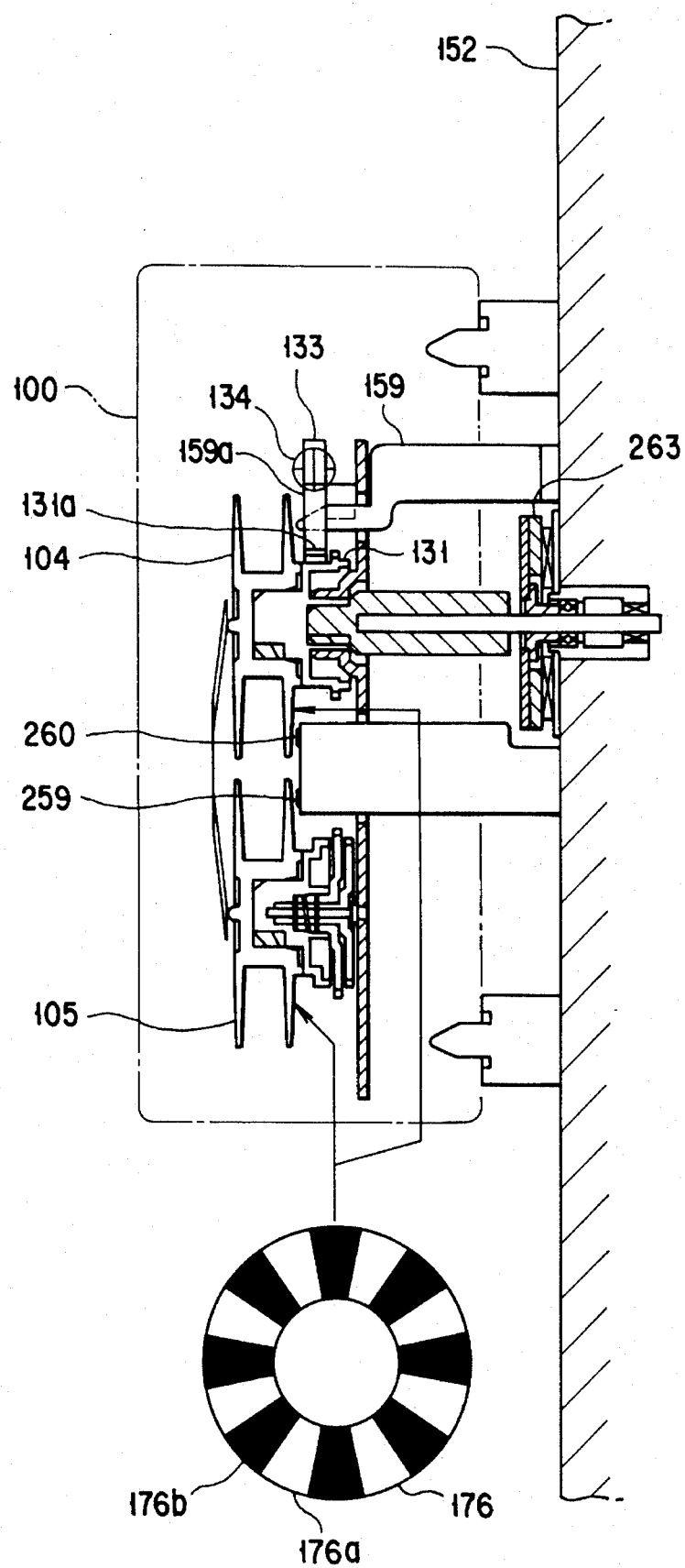
FIG. 11 is a further diagram depicting the relationship between the camera and the playback device.

As shown in FIG. 11, a soft brake release cam 159 protrudes from the main base 152. The cam 159 moves into the camera 100 through the opening 121a made in the housing 121 as the camera 100 is attached to the playback device 150. The distal end of the soft brake release cam 159 is then set into the cam hole 133a made in the soft brake 133. At this time, the upper, inclined side of the soft brake release cam 159 abuts on the circumferential surface of the cam hole 133a. The soft brake 133 is slightly rotated against the force of the soft-brake spring 134, whereby the felt layer 136 moves away from the sliding face 131a, i.e., the outer circumferential surface of the supply-side reel table 131.

Figure 10:
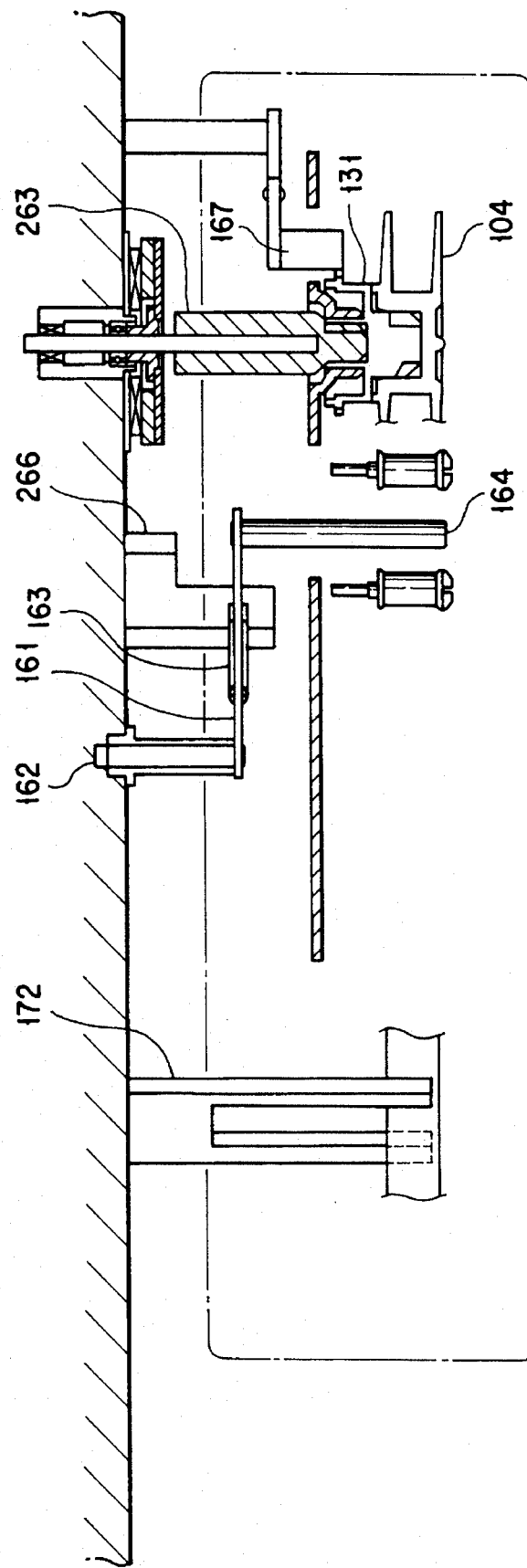
FIG. 10 is a diagram illustrating the relationship between the camera and the playback device, too.

As shown in FIG. 10, the reel motor 263 is mounted on the main base 152. When the camera 100 is attached to the playback device 150, the reel motor 263 comes into engagement with the supply-side reel table 131. The table 131 can then be loaded in the direction opposite to the direction in which it rotates to feed the tape 103 from the supply reel 104, to thereby applying a tension on the magnetic tape 103.

Figure 8:
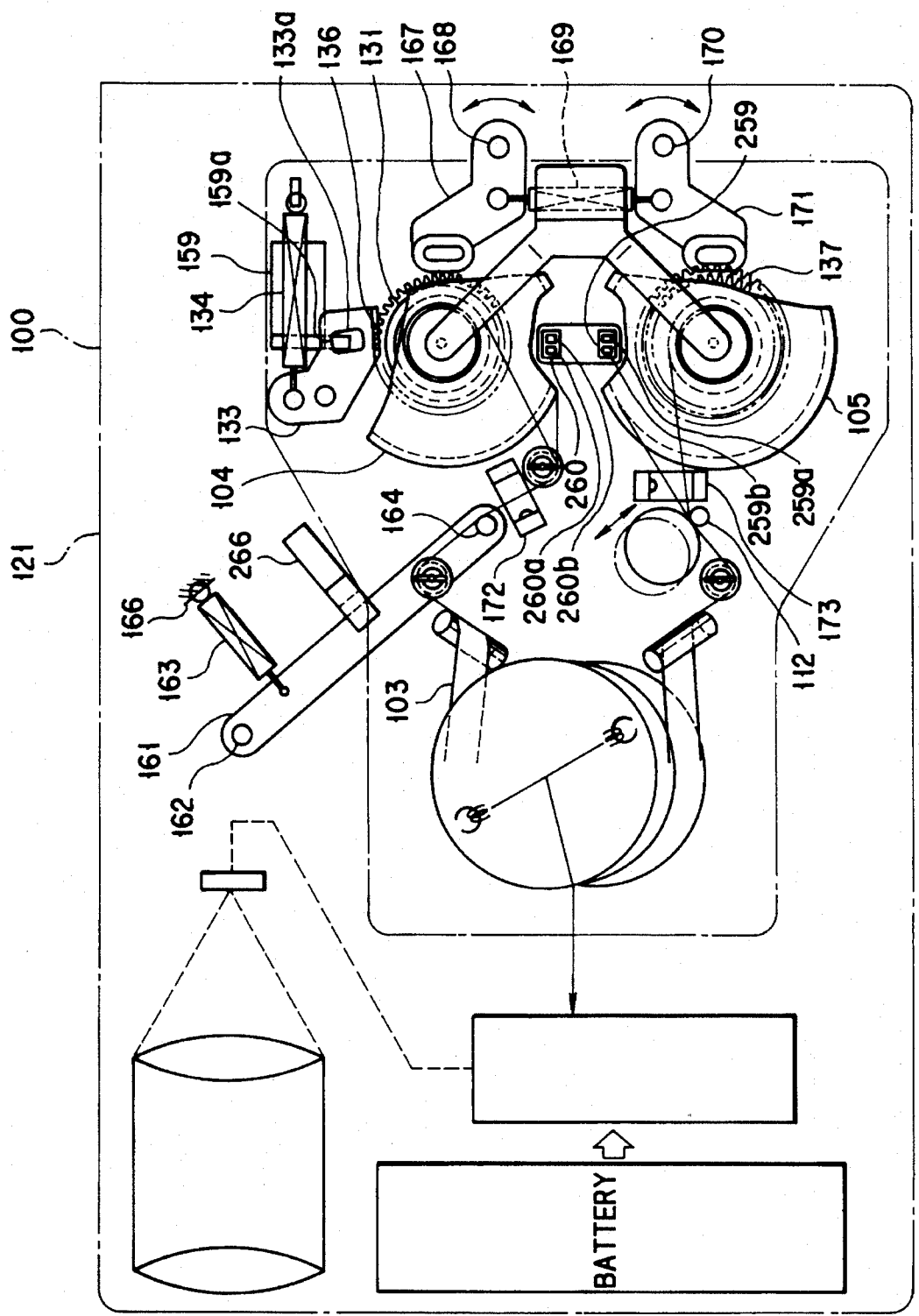
FIG. 8 is another diagram illustrating the relationship between the camera and the playback device.

It will be explained how the drive force for applying a tension on the tape 103 is controlled. As shown in FIG. 8, a tension arm 161 can rotate around a tension arm pin 162 vertically protruding from the main base 152. A tension guide 164 vertically projects from the tension arm 161. A tension spring 163 is stretched between the tension arm 161 and a tension spring hook 166 secured to the housing 121, applying a moment on the tension arm 161 to rotate the arm 161 counterclockwise around the tension arm pin 162. The tension guide 164 enter the housing 121 through the opening 121a and contacts the magnetic tape 103 at its end. At this time, the tension arm 161 assumes such a position that the tension the reel motor 263 applies on the tape 103 balances with the the moment the spring 163 applies on the arm 161. This position is detected by a tension sensor 266 mounted on the main base 152. The tension sensor 266 outputs a position signal having a magnitude almost proportional to the tension on the magnetic tape 103. The sensor 266 enters the camera 100 through the opening 121a of the housing 121.

A supply-side main brake 167 and a takeup-side main brake 171 are provided in the playback device 150. The main brake 167 can rotate around a supply-side main brake shaft 168 by a braking mechanism (not shown) which is arranged on the main base 152. The main brake 171 can rotate around a takeup-side main brake shaft 170 by the braking mechanism.

Both main brakes 167 and 171 enter the camera 100 through the opening 121a of the housing 212. A main brake spring 169 is stretched between the main brakes 167 and 171. They are spaced apart from the supply-side reel table 131 and the takeup-side reel table 137, respectively, while the playback device 150 is reproducing signals from the magnetic tape 103. To feed the tape 103 fast or to stop the rewinding thereof, the braking mechanism moves the main brakes 167 and 171 into contact with the supply-side reel table 131 and the takeup-side reel gear 139, respectively, whereby the reel tables 131 and 137 are stopped. In this regard, it should be noted that the gear 139, which is formed integral with the table 137, is rotated when the reel table 137 is rotated.

A supply-side tape end sensor 172 and a takeup-side tape end sensor 173 enter the camera 100 through the opening 121a of the housing 121. The supply-side tape end sensor 172 has a light-emitting diode (not shown) and a phototransistor (not shown). The diode and the phototransistor oppose each other, with the tape 103 passing between them, for detecting the transparent ending portion of the magnetic tape 103. The takeup-side tape end sensor 173 is identical in structure to the supply-side tape end sensor 172 and is provided to detect the transparent starting portion of the magnetic tape 103.

The supply-side reel sensor 260 and the takeup-side reel sensor 259 enter the camera 100 through the opening 121a of the housing 121. The supply-side reel sensor 260 has a light-emitting diode 260a and a phototransistor 260b at its distal end. The light emitted by the diode 260a is applied to a reflector 176 which is bonded to the lower surface of the supply reel 104. As shown in FIG. 11, the reflector 176 is a disc formed of light-reflecting sectors 176a and light-absorbing sectors 176b which are alternately arranged. The light reflected by any light-reflecting sector 176a is applied onto the phototransistor 260b. The the phototransistor 260b repeatedly generates an electric signal while the supply reel 104 is rotating. The supply-side reel sensor 260 can therefore detect whether or not the supply reel 104 is rotating. The takeup-side reel sensor 259 has the same structure as the supply-side reel sensor 260 and can detect whether or not the takeup reel 105 is rotating.

Figure 13:
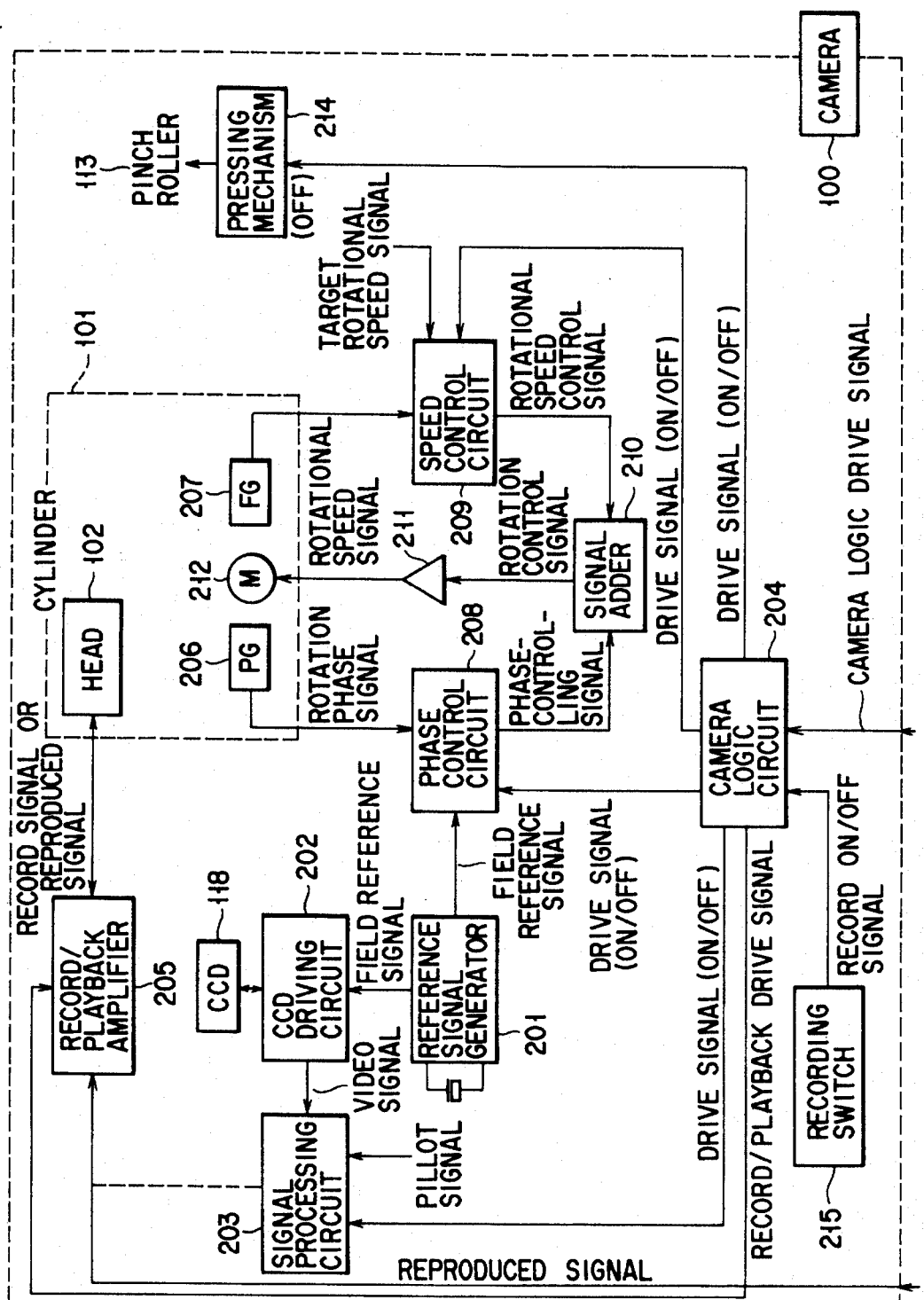
FIG. 13 is a block diagram showing the electric system of the camera and also explaining how the camera cooperates with the playback device to reproduce signals from magnetic tape.
Figure 14:
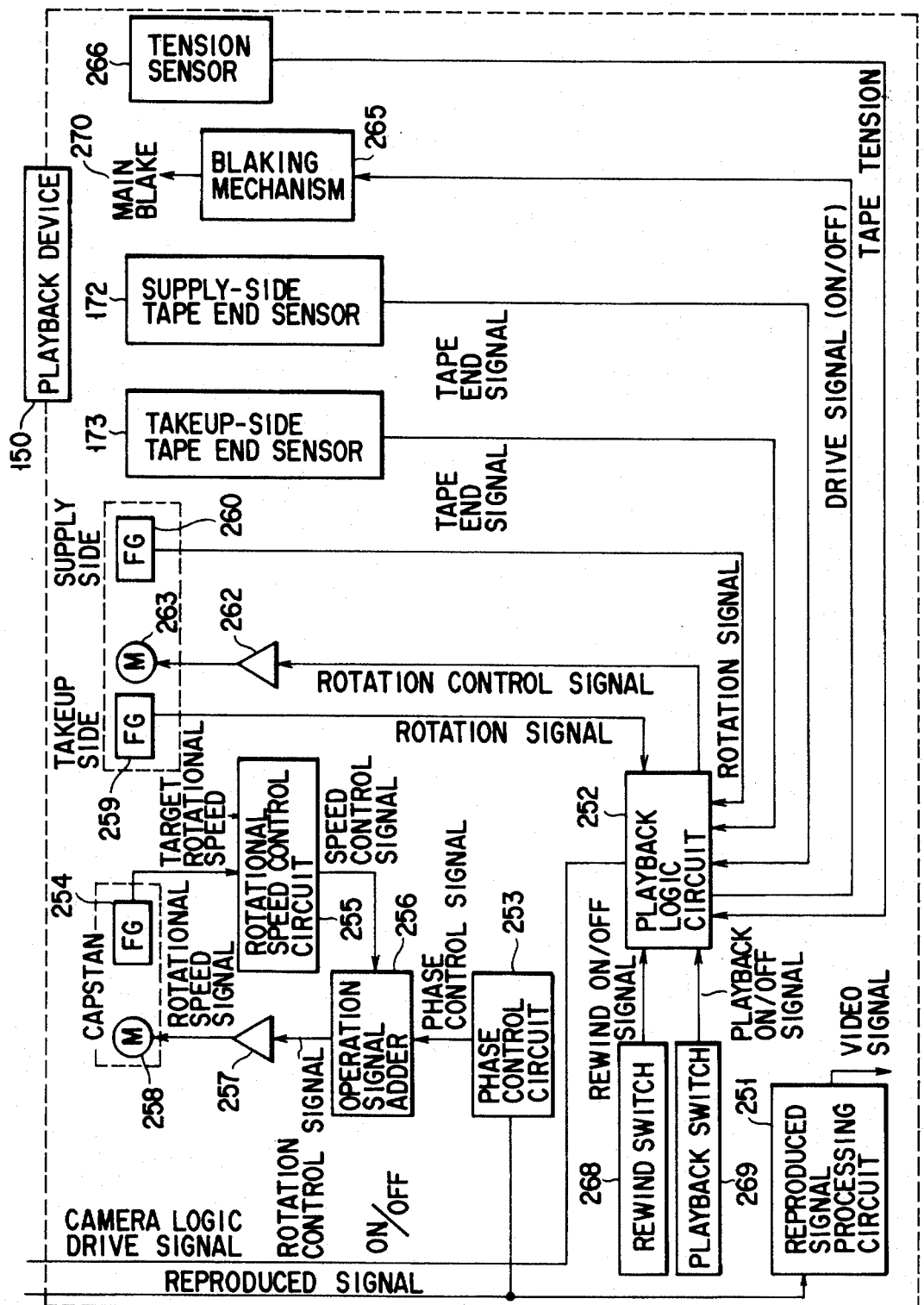
FIG. 14 is a block diagram showing the electric system of in the playback device.

FIG. 13 is a block diagram of the control system incorporated in the camera, explaining how the camera cooperates with the playback device to reproduce signals from magnetic tape. FIG. 14 is a block diagram of the control system incorporated in the playback device. With reference to these figures, it will be described how the camera 100 and the device 150 cooperate to rewind the magnetic tape 103 and reproduce signals from the tape 103.

To rewind the tape 103 and reproduce signals from the tape 103, the user attaches the camera 100 to the playback device 150. The record/playback amplifier 205 of the camera 100 is thereby connected at its output to the reproduced signal processing circuit 251 incorporated in the playback device 150, and the camera logic circuit 204 is connected to the output of the playback logic circuit 252 incorporated in the playback device 150.

Once electrically connected to the playback logic circuit 252, the camera logic circuit 204 sets the drive signals to the signal processing circuit 203 and the phase control circuit 208 at the off-level, no matter whether the use has turned on or off record switch 215, and generates and supplies a record/playback drive signal to the record/playback amplifier 205. The reproduced signal processing circuit 251 converts the signal output from the amplifier 205 to a vide signal.

The phase control circuit 253 extracts a pilot signal from the reproduced signal and determines a displacement of the head 102 with respect to the recording track of the magnetic tape 103. It then generates a phase control signal for eliminating the displacement. A rotational speed detector 254 is connected to the capstan motor 258; it detects the rotational speed of the motor 258 and produces a rotational speed signal having a magnitude proportional to the rotational speed detected. This speed signal is supplied to a rotational speed control circuit 255, which generates a speed control signal for controlling the capstan motor 258 so that the speed of the motor 258 may become equal to a target rotational speed. The speed control signal is supplied to an operation signal adder 256. The phase control signal the phase control circuit 253 has generated is also supplied to the adder 256. The operation signal adder 256 adds these input signals, producing a rotation control signal.

The rotation control signal is supplied to a motor amplifier 257. The amplifier 257 amplifies the rotation control signal, which drives the capstan motor 258. The takeup-side reel sensor 259 detects that the takeup reel 105 is rotating, and then produces a rotation signal, whereas the supply-side reel sensor 260 detects that the supply reel 104 is rotating. The sensors 259 and 260 produce a rotation signal each. The rotation signals are supplied to the playback logic circuit 252. The circuit 252 generates a rotation control signal, which is input to a motor amplifier 262. The motor amplifier 262 amplifies the rotation control signal, which drives the reel motor 263.

Upon detecting the end portion of the magnetic tape 103, the supply-side tape end sensor 172 and the takeup-side tape end sensor 173 generate tape end signals, which are supplied to the playback logic circuit 252. When the circuit 252 receives the tape end signal from the sensor 172 or 173, it outputs a drive signal, which is supplied to a braking mechanism 265. If the drive signal is at the on-level, the braking mechanism actuates a main brake 270 which comprises the supply-side main brake 167 and the takeup-side main brake 171. The tension signal output from the tension sensor 266 is input to the playback logic circuit 252.

The playback logic circuit 252 receives a rewind on/off signal from a rewind switch 268 and also a playback on/off signal. When the rewind on/off signal is at the on-level, the circuit 252 operates to rewind the magnetic tape 103. When the playback on/off signal remains is at the on-level, the circuit 252 operates to reproduce signals from the magnetic tape 103. When both the rewind on/off signal and the playback on/off signal are at the off-level, the circuit 252 is set in waiting state. In the waiting state, the playback logic circuit 252 turns off the camera logic circuit 204 and sets the drive signal to the braking mechanism 256 and the rotation control signal to the motor amplifier 262 at the on-level and the off-level, respectively.

To rewind the magnetic tape 103, the playback logic circuit 252 sets the drive signal to the camera logic circuit 204 at the off-level, and supplies a rotation control signal to the motor amplifier 262. The playback logic circuit 252 also monitors the rotation signals output from the takeup-side reel sensor 259 and the supply-side reel sensor 260. When either rotation signal is at the off-level, the circuit 252 determines that the reel driving means is malfunctioning. In this case, the circuit 252 sets the rotation control signal to the motor amplifier 262 at the off-level, and sets the drive signal to the braking mechanism 265 at the on-level to drive the main brake 270.

To reproduce signals from the magnetic tape 103, the playback logic circuit 252 sets the drive signals to the camera logic circuit 204 and the braking mechanism 265 at the off-level, and also changes the magnitude of the rotation control signal to the motor amplifier 262 to adjust the torque of the takeup-side reel motor 263. During the playback operation, the playback logic circuit 252 keeps monitoring the rotation signals produced by the takeup-side reel sensor 259 and the supply-side reel sensor 260, thereby determining whether the reels 104 and 105 are rotating or not. If the circuit 252 determines that the reel 104 or 105 is not rotating, it sets the drive signal to the camera logic circuit 204 at the off-level to stop the playback operation, and sets the drive signal to the braking mechanism 265 at the on-level to actuate the main brake 270. Furthermore, the playback logic circuit 252 monitors the tape end signal from the supply-side tape end sensor 172. When the tape end signal assumes the on-level, indicating that the sensor 172 has just detected the end portion of the tape 103, the circuit 252 sets the drive signal to the camera logic circuit 204 at the off-level to stop the playback operation, and also sets the drive signal to the braking mechanism 265 at the on-level to actuate the main brake 270.

As described above, when the camera 100 is connected to the playback device 150, the camera logic circuit 204 sets the drive signals to the signal processing circuit 203 and the phase control circuit 208 at the off-level, and sets the drive signal to the speed control circuit 209 at the on-level. As a result, the rotary drum 101 is rotated at the target speed, the reproduced signal processing circuit 251 converts the reproduced signal output from the head 102 to a video signal, and the capstan motor 258 is driven at the target speed while the head 102 is correctly tracing the recording track of the magnetic tape 103.

When the rewind on/off signal from the rewind switch 268 is at the off-level, the playback logic circuit 252 sets the drive signal to the camera logic circuit 204 at the off-level again if the playback on/off signal from the playback switch 269 is at the off-level. Hence, the camera logic circuit 204 sets the drive signal to the pressing mechanism 214 at the off-level, whereby the pinch roller 113 is held away from the capstan 112. In this condition, no tape running is performed. The playback logic circuit 252 sets the rotation control signal to the motor amplifier 262 at the off-level and sets the drive signal to the braking mechanism 265 at the off-level, whereby neither the reel 104 nor the reel 105 is rotated at all.

When the rewind on/off signal from the rewind switch 268 is at the on-level, the playback logic circuit 252 outputs a rotation control signal to the motor amplifier 262 so that the tape 103 may be rewound. At the same time, the circuit 252 sets the drive signal to the braking mechanism 264 at the off-level, whereby the main brake 270 is released. The magnetic tape 103 is thereby rewound. When the circuit 252 determines that the reel 104 or 105 is not rotating, or when the takeup-side tape end sensor 173 detects the end portion of the tape 103, the tape winding is stopped.

When the playback on/off signal is at the on-level, the playback logic circuit 252 sets the drive signal to the braking mechanism 265 at the off-level, thus releasing the main brake 270, and sets the drive signal to the camera logic circuit 204 at the on-level, thereby pressing the pinch roller 113 onto the capstan 112. The tape running is thereby performed, and the playback operation is initiated. The playback logic circuit 252 controls the rotation control signal to the reel motor 263 in accordance with the tape tension detected by the tension sensor 266, thereby maintaining the tape tension at a prescribed value. When the circuit 252 determines that the reel 104 or 105 is not rotating, or when the supply-side tape end sensor 172 detects the end portion of the tape 103, the tape winding is stopped.

The present invention is not limited to the record/playback apparatus described above.

Operation of the Camera of Embodiment 2

The operation of a camera 100 incorporated in a record/playback apparatus according to a second embodiment of the invention will be explained, with reference to FIG. 15 and FIGS. 16A and 16B.

Figure 15:
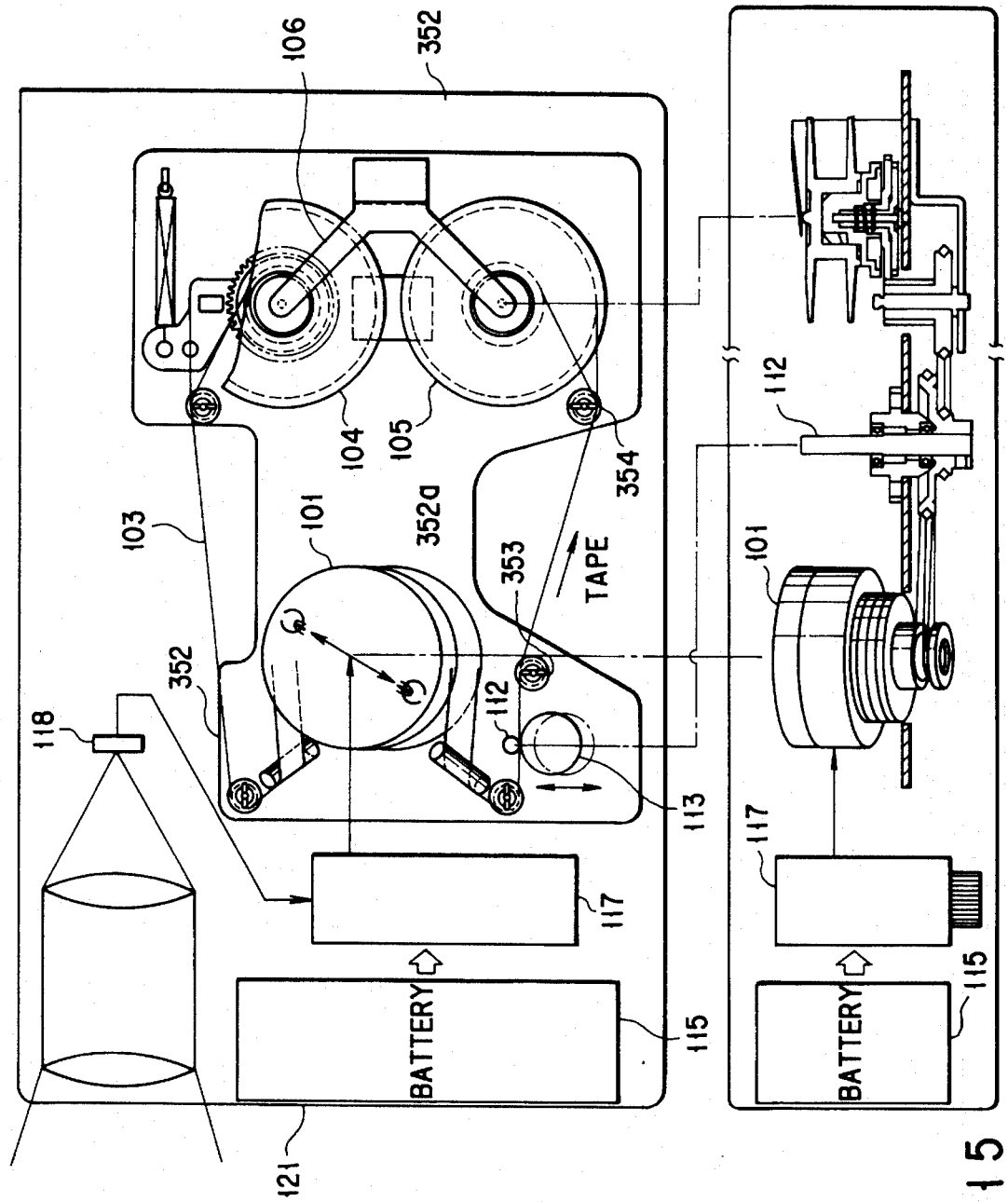
FIG. 15 is a diagram illustrating a part of the camera of another image record/playback apparatus according to the present invention.
Figure 16A:
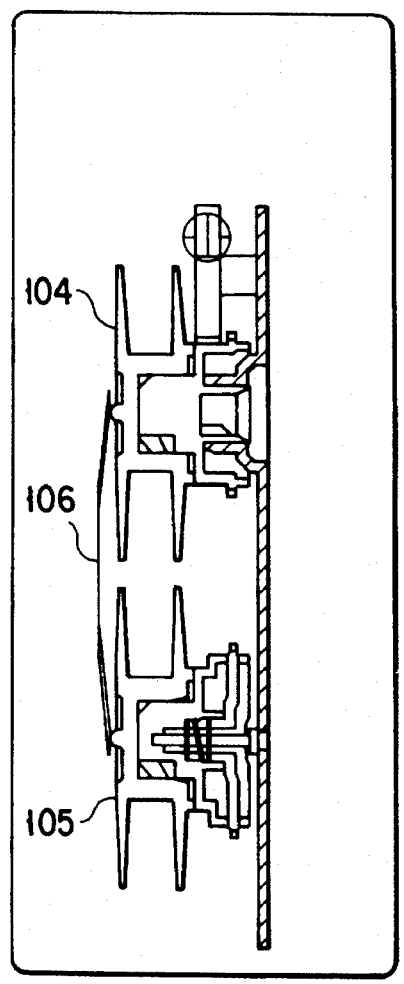
FIGS. 16A and 16B are sectional view showing two sections of the camera shown in FIG. 15.
Figure 16B:
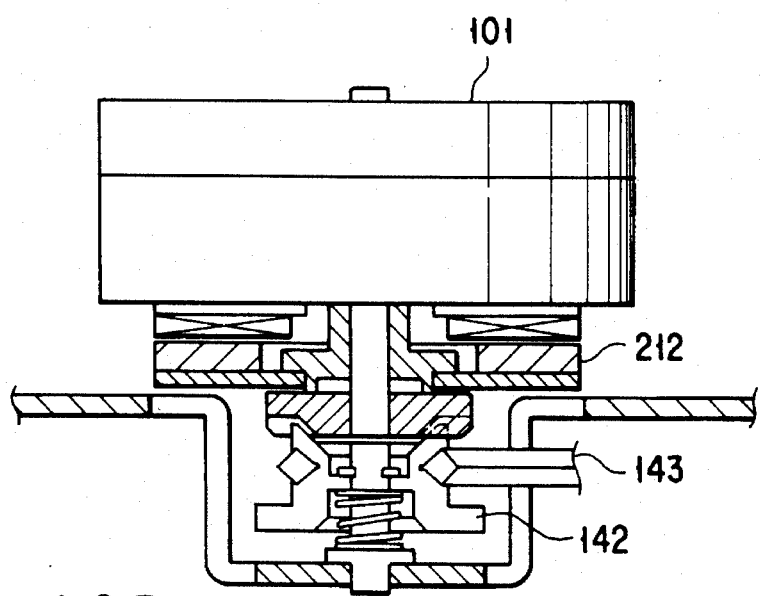

FIG. 15 consists of a plan view and a front view of the camera 100. FIG. 16A is a side view of the camera 100, whereas FIG. 16B is a sectional view of a device for driving the rotary drum 101 used in the camera 100.

The camera 100 is similar to its counterpart of the first embodiment and designed to record images and sound, but is different in some respects.

In the first embodiment, the rotary drum 101 incorporated in the camera 100 is used to record signals on the tape 103 and to reproduce the signals from the tape 103 while the camera 100 is connected to the playback device 150. On the other hand, in the second embodiment, the rotary drum 101 incorporated in the camera 100 is used only to record signals on magnetic tape 103. To reproduce the signals from the tape, the rotary drum 101 incorporated in a playback device (later described) is used. Hence, it is necessary to wrap the tape 103 around the rotary drum 101 of the playback device in order to reproduce signals from the magnetic tape 103.

As shown in FIG. 15, the base plate 352 of the camera 100 has a U-notch 352a through which that portion the tape 103 which is moving along a tape-running path can be drawn from the housing 351 of the camera 100. Two additional roller guides, i.e., a third roller guide 353 and a fourth roller guide 354, are provided for guiding the tape 102 which is being fed from the capstan 112 toward the takeup reel 105. The drum 101, the capstan 112 and the pinch roller 113 perform their respective functions only during the recording operation.

Figure 17:
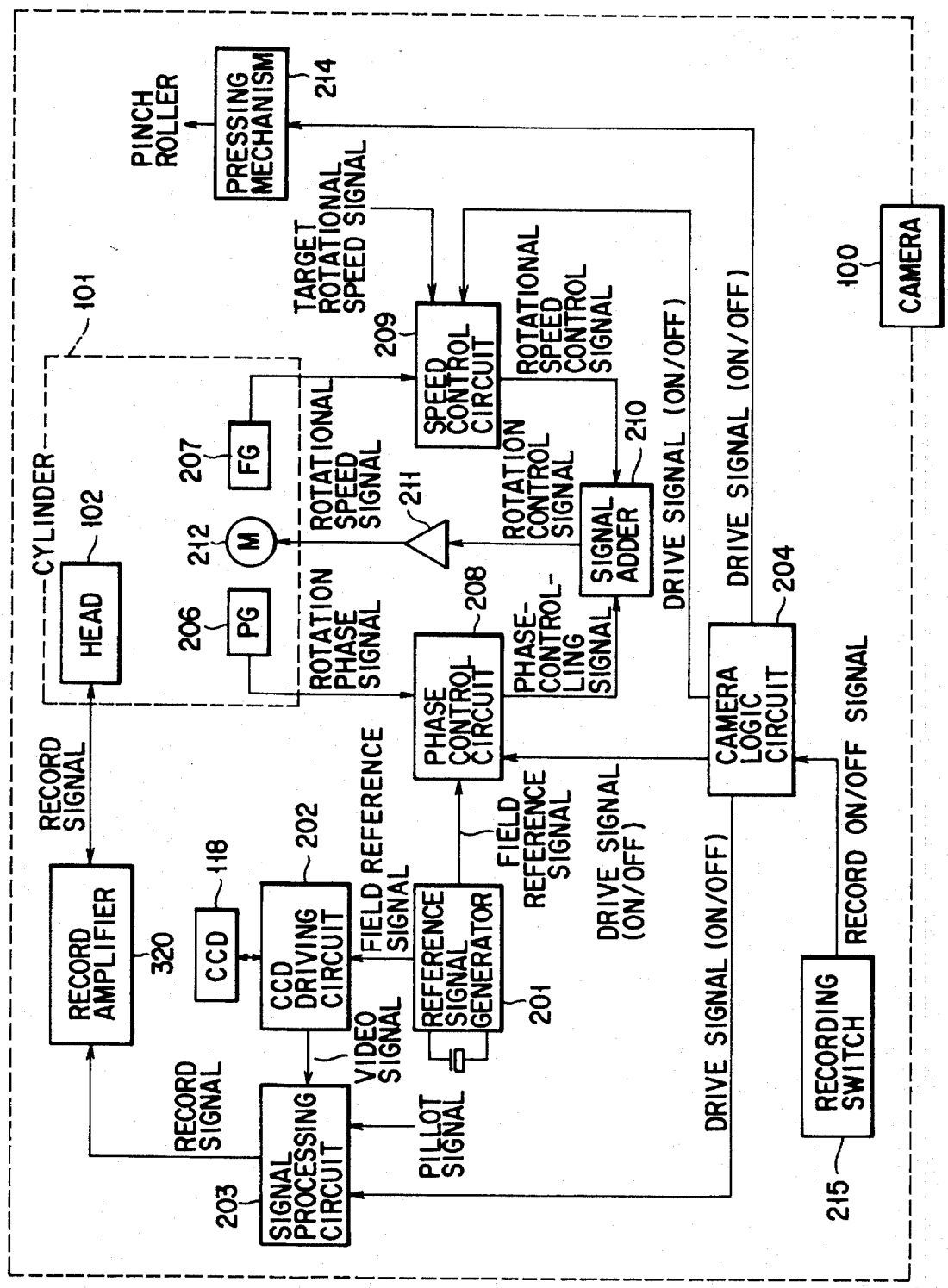
FIG. 17 is a block diagram showing the electric system of the camera shown in FIG. 15.

FIG. 17 is a block diagram of the control system incorporated in the camera 100. The system differs from its counterpart of the first embodiment, only in that a record amplifier 320 is employed in place of the record/playback amplifier 205. The components of the camera 100 which are identical to those used in the first embodiment are designated at the same numerals as in FIGS. 4 and 13. The control system of FIG. 17 operates in the same way as its counterpart of the first embodiment, except for the following points. When the record on/off signal from the record switch 215 is at the off-level, the camera logic circuit 204 sets the drive signals to the signal processing circuit 203 and the pressing mechanism 214 at the off-level. Conversely, when the record on/off signal from the record switch 215 is at the on-level, the circuit 204 sets the drive signals to the circuit 203 and the mechanism 214 at the on-level. The record amplifier 320 amplifies the record signal output from the signal processing circuit 203 and supplies the signal to the magnetic head 301.

Playback Device of Embodiment 2

Figure 18:
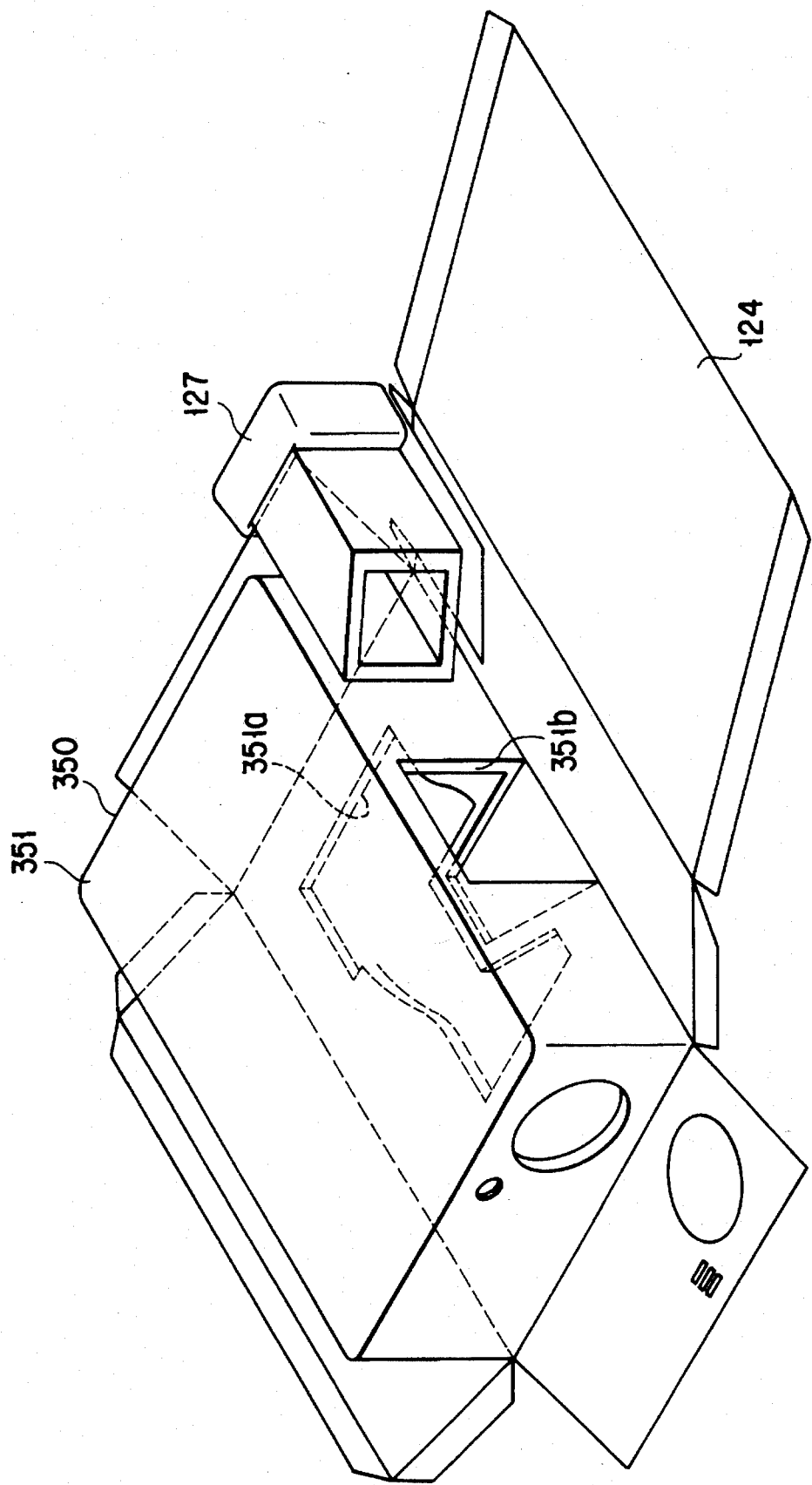
FIG. 18 is a perspective view of the casing of the camera shown in FIG. 15.

The record/playback apparatus according to the second embodiment has a playback device 355. To reproduce a video signal from the magnetic tape 103, the casing 124 is removed from the camera 100 as shown in FIG. 18, thus exposing the housing 351 of the camera 100. The housing 351 has two openings 351a and 351b which are closed by the casing 124 as long as the camera 100 is used to photograph an object.

It will be explained how the camera 100 and the playback device 355 cooperate to reproduce the signal from the tape 103, with reference to FIGS. 19 to 23.

Figure 19:
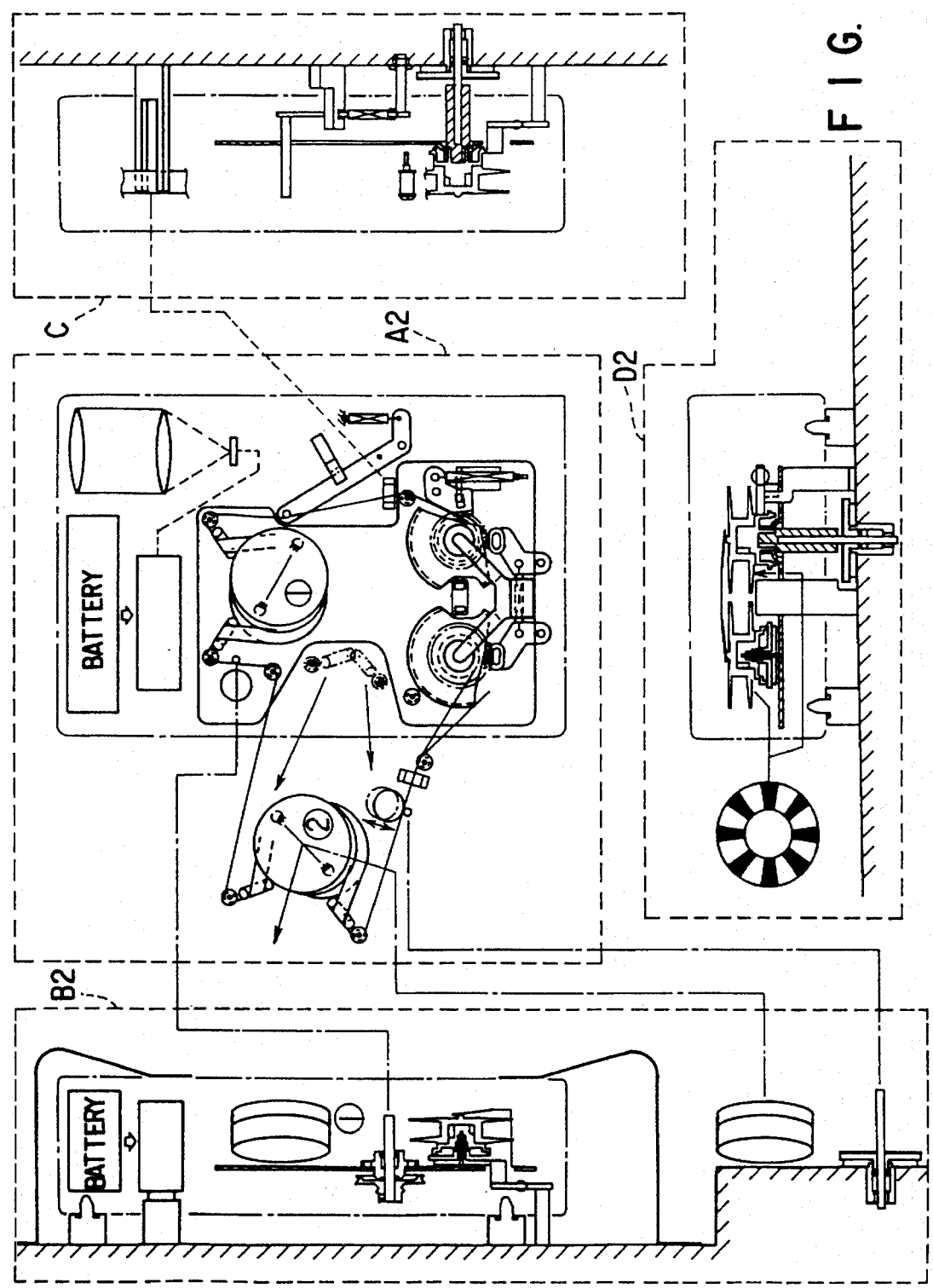
FIG. 19 is a diagram representing the relationship between the camera and playback device of the other apparatus according the invention.

FIG. 19 includes a plan view, a front view, a back view and a side view, representing the relationship between the camera 100 and the playback device 355. Blocks A2, B2, C2 and D2 shown in FIG. 19 are more specifically illustrated in FIGS. 20, 21, 22, and 23, respectively.

The camera 100 is set in the playback device 355 after the casing 124 has been removed. The playback device 355 is similar to the playback device 150 of the first embodiment. Its structural features will be apparent from the following description.

Figure 20:
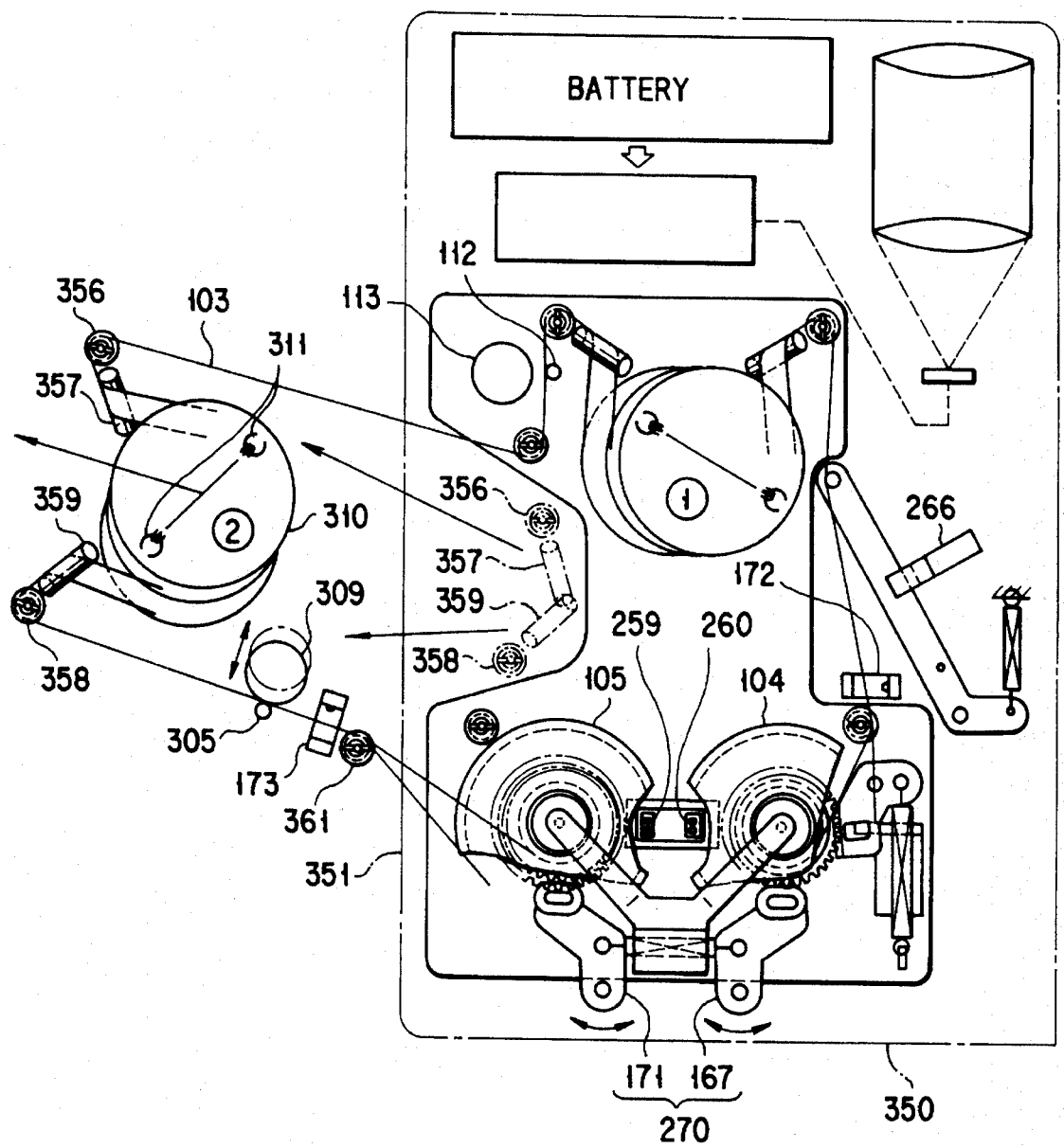
FIG. 20 is another diagram illustrating the relationship between the camera and playback device of the other record/playback apparatus.
Figure 23:
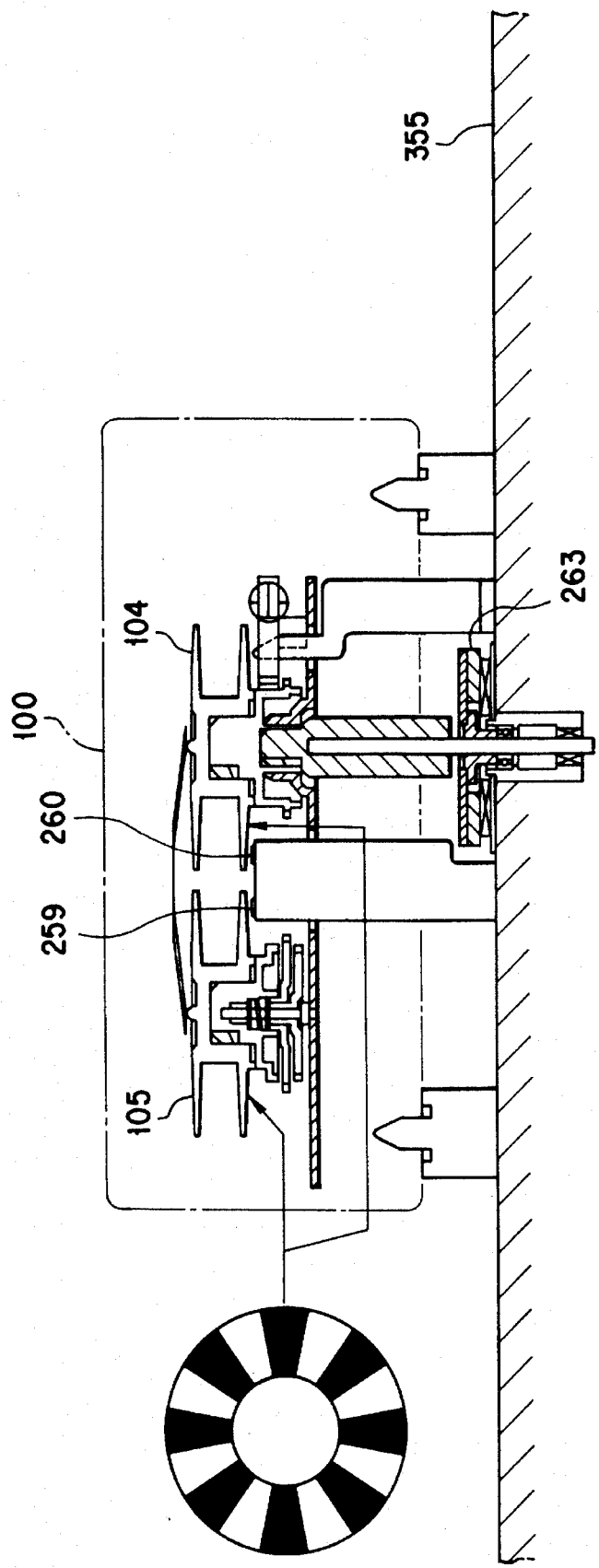
FIG. 23 is a further diagram depicting the relationship between the camera and playback device of the other record/playback apparatus.

When the camera 100 is set in the playback device 355, a supply-side loading guide 356, a supply-side inclined guide 357, a takeup-side loading guide and a takeup-side inclined guide 359 enter the camera 100 through the opening 351b of the housing 351 of the camera 100 as illustrated in FIG. 20. Thereafter, the guides 356 to 359 are moved by a tape loading mechanism (not shown) incorporated in the playback device 335, thereby drawing a portion of the tape 103 to the position indicated by a solid line. At this position, the magnetic tape 103 is wrapped around the rotary drum 310 of the playback device 355.

Next, the pinch roller 309 and the takeup-side tape end sensor 173 is lifted by a lift mechanism (not shown) incorporated in the device 335. The pinch roller 309 comes to oppose a capstan 305, whereby the tape 103 is placed between the capstan 305 and the roller 309. At this time, the takeup-side tape end sensor 173 is located, with the tape 103 positioned between its light-emitting diode and its phototransistor. The pinch roller 309 is pushed to the position indicated by solid lines by a pressing mechanism 325 incorporated in the playback device 355. The tape 103 is thereby pinched between the capstan 305 and the pinch roller 309. A rotatably roller guide 361 vertically extends from the main base 362 of the playback device 355, for guiding the magnetic tape 103 so that the tape 103 may be smoothly wrapped around the rotary drum 310. The supply-side tape end sensor 172 enters the camera 100 through the opening 351a of the housing 351, for detecting the end portion of the tape 103 in the same way as in the first embodiment. The signal is reproduced from the tape 103 by the heads 311 which are contained in the rotary drum 310.

Except for the points described above, the play back device 355 is identical in structure and operation to the playback device 150 used in the first embodiment.

Figure 24:
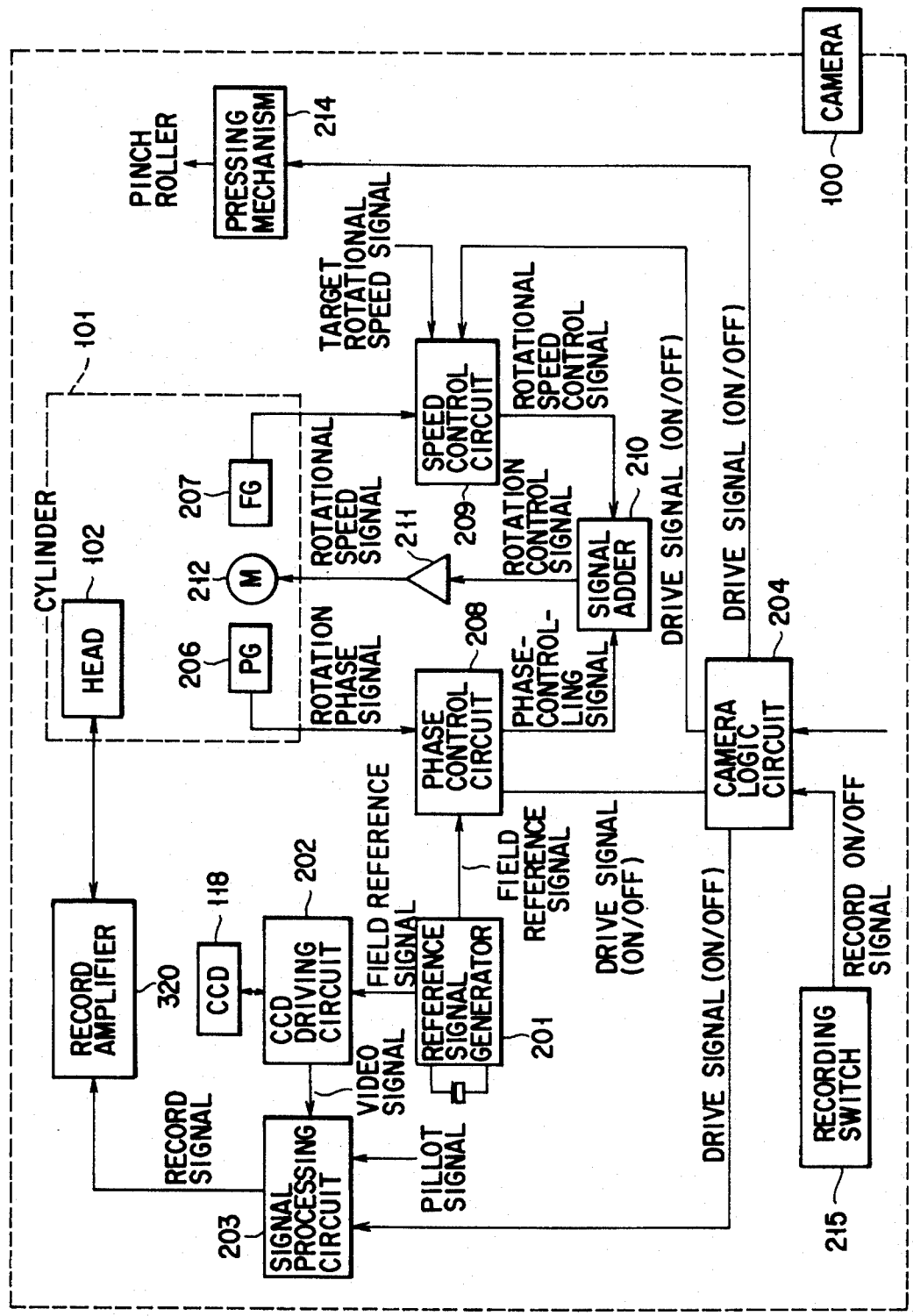
FIG. 24 is a block diagram showing the electric system of the camera shown in FIG. 15.
Figure 25:
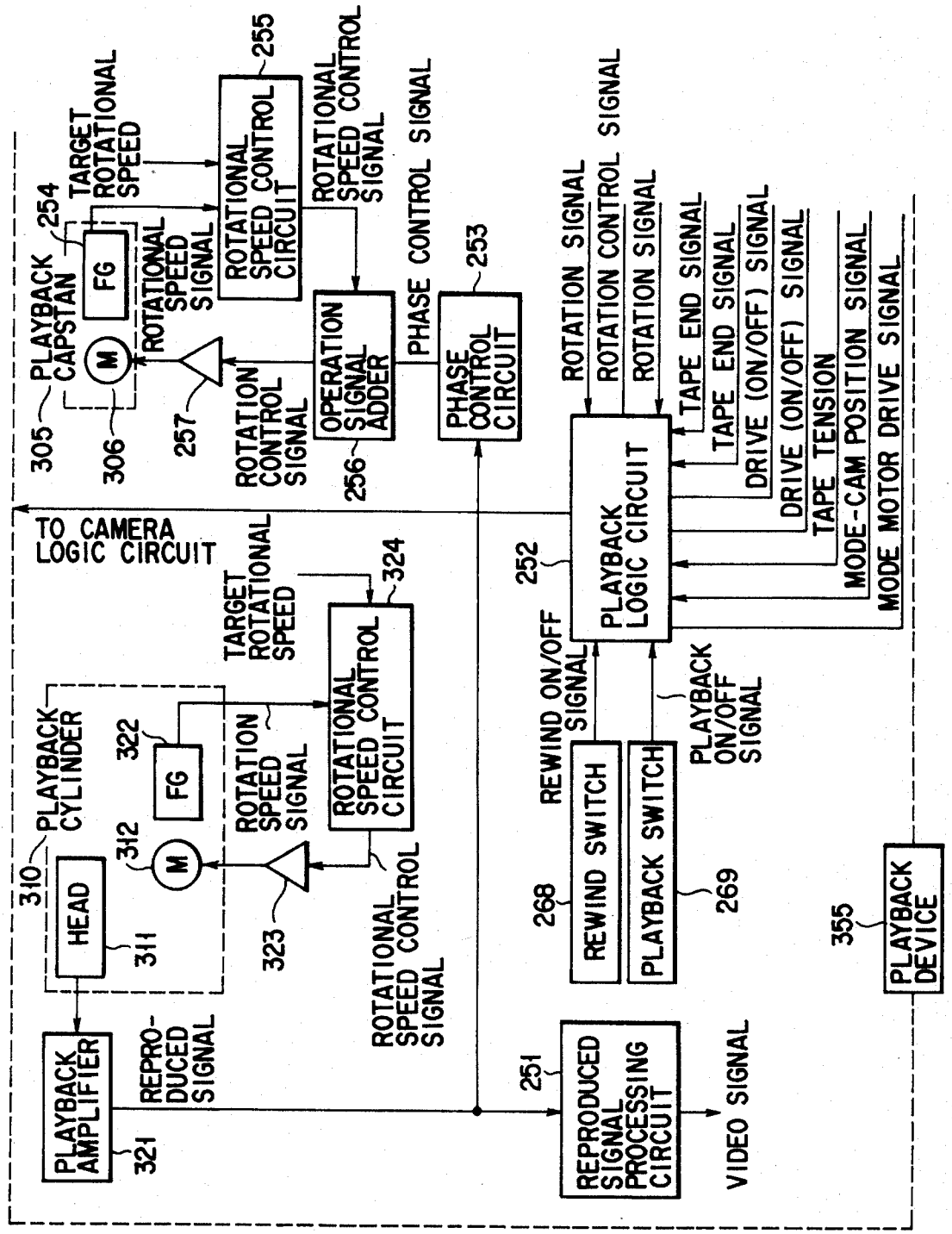
FIG. 25 is a block diagram illustrating the electric system of the playback device of the other apparatus.

FIGS. 24 to 26 are block diagrams showing the control systems incorporated in the camera 100 and the playback device 355. With reference to these figures, it will be described how the tape 103 is rewound and how signals are reproduced from the tape 103.

To rewind the tape 103 and subsequently reproduce signals therefrom, the camera 100 is attached to the playback device 355. Then, the playback logic circuit 252 keeps monitoring the signal output by a mode-cam position sensor 326 and drives a mode motor 327 in accordance with the signal, thereby controlling the tape loading mechanism. Thus controlled, the tape loading mechanisms draws a portion of the tape 103 from the camera 100 and wraps it around the rotary drum 310. In the heads 311 contained in the rotary drum 310 reproduce a signal from the magnetic tape 103. This signal is supplied to a playback amplifier 321 and amplified thereby. The signal, thus amplified, is supplied to a reproduced signal processing circuit 251. The circuit 251 converts the signal to a video signal.

A rotational speed detector 322 is connected to the reproduced signal processing circuit 251. The detector 322 generates a rotational speed signal whose magnitude is proportional to the rotational speed of the rotating cylinder of the drum 310. The rotational speed signal is input to a rotational speed control circuit 324. The circuit 324 generates a speed control signal, which is supplied to a motor amplifier 323 and is amplified thereby. The speed control signal is then supplied to a cylinder motor 312. Driven by the signal, the cylinder motor 312 rotates the cylinder at a target rotational speed.

Meanwhile, a phase control circuit 253 extracts a pilot signal from the reproduced signal and determines a displacement of the heads 311 with respect to the recording track of the magnetic tape 103. It then generates a phase control signal for eliminating the displacement. A rotational speed detector 254 is connected to the capstan motor 306; it detects the rotational speed of the motor 306 and produces a rotational speed signal having a magnitude proportional to the rotational speed detected. This speed signal is supplied to a rotational speed control circuit 255, which generates a speed control signal for controlling the capstan motor 306 so that the speed of the motor 396 may become equal to the target rotational speed.

The speed control signal is supplied to an operation signal adder 256. The phase control signal which the phase control circuit 253 has generated is also supplied to the adder 256. The adder 256 adds these input signals, producing a rotation control signal. The rotation control signal is supplied to the capstan motor 306 via a motor amplifier 257.

A takeup-side reel sensor 259 detects the rotation of a takeup reel 105 and generates a rotation signal, whereas a supply-side reel sensor 260 detects the rotation of a supply reel 104 and generates a rotation signal. A motor amplifier 262 amplifies the rotation control signal output from the playback logic circuit 252a. The rotation control signal, now amplified, is supplied to a reel motor 263, driving the motor 263. Upon detecting an end portion of the magnetic tape 103, a takeup-side tape end sensor 173 and a supply-side tape end sensor 172 generate a tape end signal, which is supplied to the playback logic circuit 252a.

A braking mechanism 265 receives a drive signal output from the playback logic circuit 252. When the drive signal is at the on-level, the mechanism 265 drives a main brake 270. The pressing mechanism 325 receives a drive signal output from the circuit 252. When the drive signal is at the on-level, the mechanism 325 presses the pinch roller 309 onto the playback capstan 305. The tape tension data output from a tension sensor 266 is input to the playback logic circuit 252.

When the rewind on/off signal from a rewind switch 268 is at the on-level, the playback logic circuit 252 sets the playback device 355 in rewind mode. When the playback on/off signal from a playback switch 269 is at the on-level, the circuit 252 sets the playback device 355 in playback mode. When both the rewind on/off signal and the playback on/off signal are at the off-level, the circuit 252 sets the device 355 in waiting state. In the waiting state, the playback logic circuit 252 sets the drive signal to the braking mechanism 265 at the on-level, the drive signal to the pressing mechanism 325 at the off-level, and the drive signal to the motor amplifier 262 at the off level.

In the rewind mode, the playback logic circuit 252 sets the drive signal to the braking mechanism 265 at the off-level and supplies a rotation control signal to the motor amplifier 262. To rewind the magnetic tape 103, the circuit 252 monitors the rotation signals from the reel sensors 259 and 260. When either rotation signal is at the off-level, the circuit 252 determines that the reel driving means is malfunctioning. If this is the case, the circuit 252 sets the rotation control signal to the motor amplifier 262 at the off-level, and sets the drive signal to the braking mechanism 265 at the on-level to drive the main brake 270. Furthermore, the playback logic circuit 252 monitors the tape end signal from the takeup-side tape end sensor 173. When the tape end signal assumes the on-level, indicating that the sensor 173 has just detected the end portion of the tape 103, the circuit 252 sets the drive signal to the motor amplifier 262 at the off-level, thereby to stop the rewinding of the tape 103, and also sets the drive signal to the braking mechanism 265 at the on-level to actuate the main brake 270.

In the playback mode, the playback logic circuit 252 sets the drive signals to the pressing mechanism 252 at the on-level and the drive signal to the braking mechanism 265 at the off-level. It also changes the magnitude of the rotation control signal to the motor amplifier 262 to adjust the torque of the takeup-side reel motor 263. During the playback operation, the circuit 252 keeps monitoring the rotation signals produced by the takeup-side reel sensor 259 and the supply-side reel sensor 260, thereby determining whether the reels 104 and 105 are rotating or not. If the circuit 252 determines that the reel 104 or 105 is not rotating and that the reel driving means is malfunctioning, it sets the drive signal to the pressing mechanism 325 at the off-level to stop the playback operation, and sets the drive signal to the braking mechanism 265 at the on-level to actuate the main brake 270. Furthermore, the playback logic circuit 252 monitors the tape end signal from the supply-side tape end sensor 172. When the tape end signal assumes the on-level, indicating that the sensor 172 has just detected the end portion of the tape 103, the circuit 252 sets the drive signal to the pressing mechanism 325 at the off-level to stop the playback operation, and also sets the drive signal to the braking mechanism 265 at the on-level to actuate the main brake 270.

When the camera 100 is connected to the playback device 355, the camera logic circuit 204 sets the drive signals to the signal processing circuit 203 and the phase control circuit 208 at the off-level, and sets the drive signal to the speed control circuit 209 at the on-level. As a result, the rotary drum 101 is rotated at the target speed. Meanwhile, the camera logic circuit 204 sets the drive signal to the pressing mechanism 214 at the off-level, whereby the pinch roller 113 is held away from the capstan 112. Hence, the running of the tape 103 is stopped.

In the playback system described above, the rotary drum 310 of the playback device 355 reproduces the signal which the camera 100 has recorded on the magnetic tape 103.

The playback device 355 has a recording unit for copying the data from the tape 103 contained in the camera 100 on another roll of tape which is contained in a cassette. The recording unit comprises a recording-format selecting means for selecting a recording format, such as β format, VHS format, or 8-mm format). Only one cassette slot is shown in FIG. 6. Instead, the playback device may have two or more slots through which tape cassettes for various recording formats and may also have two or more recording units for recording data on tape in various recording formats. Furthermore, to copy data from a tape roll of one recording format onto a tape roll of a different recording format, the playback device may have two or more output sections which can be connected to recorders of different formats.

Use of the Image Record/Playback Apparatus

Figure 27:
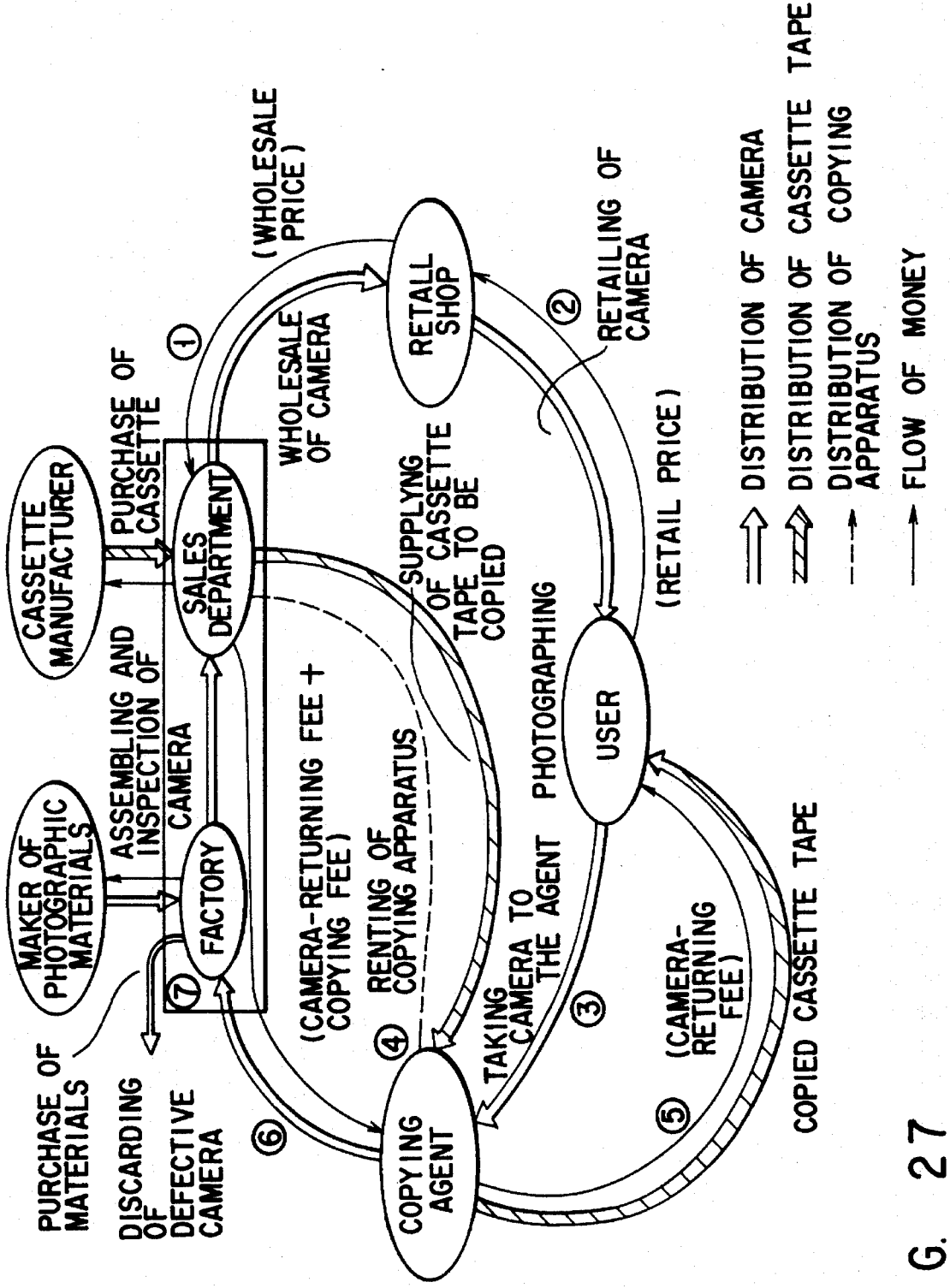
FIG. 27 is a diagram explaining the paths along which goods related to the record/playback apparatus of the invention are distributed.

FIG. 27 is a diagram explaining the paths along which goods related to the image record/playback apparatus of the invention are distributed.

Cameras are sold at retailers and bought by users. After recording data on the magnetic tape contained in the camera, a user takes the camera to a licensed copying agent who has the playback device. The agent removes the casing from the camera and then connects the camera to the playback device and copies the data from the tape 103 on a tape roll contained in a video tape cassette, and gives the video tape cassette to the user. The copying agent sends the used camera to the manufacturer of the camera. In a factory of the manufacturer, the data is erased from the magnetic tape contained in the camera, and the tape is rewound around the supply reel. The battery of the camera is recharged or replaced by a new one. Then, the camera is covered and protected by a new casing and tested for its various functions. If found to operate well, the camera is distributed from the manufacturer's sales department to a retailer, who sells the camera. The camera is thus recycled and can be used again by any person who buys it at the retail shop.

The camera may be lost, stolen or damaged while being distributed among the manufacturer's factory, the manufacturer's sales department, the retail shop, the user, and copying agent. Therefore, it is demanded that that the camera be as inexpensive as possible. This is why the camera of the any embodiment described above is made to this demand. Thus, the damage resulting from loss, theft or breakage of the camera is relatively small in rental business. In addition, the clerks of a rental shop need not follow complex non-life insurance formalities for the camera. The camera is suitable as a rental video camera which the user can "throw away" at any copying agent. Since the camera is inexpensive, it is useful to a user who does not use a camera often. Such a user can buy the camera at a shop in the city or town which he or she is visiting on a trip.

As has been described, the present invention can provide a camera which is inexpensive, small and light, and also a playback device which reproduces signals recorded by the camera.

In the above description, the signal recorded on the magnetic tape in the camera is erased in a factory. However, a erase head may be provided in each play-back apparatus, for erasing the recorded signal on the magnetic tape in the camera when the copying process is finished.

What is claimed is:

1. An image record/playback apparatus comprising a photographing device and a playback device, the photographing device comprising:
a housing;
an optical lens system provided in the housing;
an imaging element for converting an optical signal supplied through the optical lens section, into an electric signal;
a record signal processing section for processing the electric signal;
a magnetic tape for recording an output signal from the record signal processing section; and
a recording mechanism section for driving the magnetic tape, the recording mechanism section including a tape reel around which the magnetic tape is wound, a record-side tape guide for guiding the magnetic tape, a rotary magnetic head device which the magnetic tape is to contact, and a drive motor for driving the rotary magnetic head device and the magnetic tape;

the playback device being separate from the photographing device and comprising:
a connecting section for holding the photographing device;
a playback mechanism section to be dynamically connected to at least one of the recording mechanism section and the magnetic tape, the playback mechanism section including a playback-side tape guide which contacts at least the magnetic tape to guide the magnetic tape, when the photographing device is engaged with the connecting section; and
a reproduced signal processing section for processing an output signal reproduced from the magnetic tape.

2. The image record/playback apparatus according to claim 1, wherein the playback mechanism section has a brake device which abuts a rotary member rotating in synchronization with the tape reel or acts on a member abutting on the rotary member, to apply a lead torque to the tape reel, when the photographing device is engaged with the playback device.

3. The image record/playback apparatus according to claim 1, wherein the playback mechanism section further includes a playback rotary magnetic head device and a loading mechanism for guiding the magnetic tape to, and placing the magnetic tape in contact with, the playback rotary magnetic head device.

4. The image record/playback apparatus according to claim 1, wherein the playback mechanism section has a power transmission stopping device which acts on a transmission path for transmitting a driving power when the record mechanism section drives the magnetic tape, to stop power transmission between the recording mechanism section and the recording medium, when the photographing device is engaged with the connecting section.

5. The image record/playback apparatus according to claim 1, further comprising at least one recording device.

6. The image record/playback apparatus according to claim 1, further comprising a fixed erasing head.

7. An image record/playback apparatus comprising a photographing device and a playback device, the photographing device comprising:
a housing;
an optical lens system provided in the housing;
an imaging element for converting an optical signal supplied through the optical lens section, into an electric signal;
a record signal processing section for processing the electric signal;
a magnetic tape for recording an output signal from the record signal processing section; and
a recording mechanism section for driving the magnetic tape, the recording mechanism section including a tape reel around which the magnetic tape is wound, a record-side tape guide for guiding the magnetic tape, a rotary magnetic head device which the magnetic tape is to contact, and a drive motor for driving the rotary magnetic head device and the magnetic tape;

the playback device being separate from the photographing device and comprising:
a connecting section for holding the photographing device;
a playback mechanism section to be dynamically connected to at least one of the recording mechanism section and the magnetic tape, the playback mechanism section including a reel drive mechanism which is engaged with at least the tape reel to drive the tape reel, when the photographing device is engaged with the connecting section; and
a reproduced signal processing section for processing an output signal reproduced from the magnetic tape.

8. The image record/playback apparatus according to claim 7, wherein the playback mechanism section has a power transmission stopping device which acts on a transmission path for transmitting a driving power when the record mechanism section drives the magnetic tape, to stop power transmission between the recording mechanism section and the recording medium, when the photographing device is engaged with the connecting section.

9. The image record/playback apparatus according to claim 7, further comprising at least one recording device.

10. The image record/playback apparatus according to claim 7, further comprising a fixed erasing head.

* * * * *